United States Patent
Dion et al.

(10) Patent No.: US 12,487,628 B2
(45) Date of Patent: Dec. 2, 2025

(54) STORAGE ARRAY POWER THROTTLING

(71) Applicant: Dell Products, L.P., Round Rock, TX (US)

(72) Inventors: Christopher Dion, Marlborough, MA (US); Vasudevan Subramanian, Chapel Hill, NC (US); Philippe Armangau, Kalispell, MT (US); Rustem Rafikov, Hopkinton, MA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 103 days.

(21) Appl. No.: 18/474,662

(22) Filed: Sep. 26, 2023

(65) Prior Publication Data

US 2025/0103089 A1    Mar. 27, 2025

(51) Int. Cl.
*G06F 1/00* (2006.01)
*G06F 1/08* (2006.01)
*G06F 1/3296* (2019.01)

(52) U.S. Cl.
CPC ............. *G06F 1/08* (2013.01); *G06F 1/3296* (2013.01)

(58) Field of Classification Search
CPC ........ G06F 21/575; G06F 11/14; G06F 21/44; G06F 21/572; G06F 9/4401; G06F 11/1417; G06F 9/44505; G06F 3/064; G06F 8/65; G06F 8/71; G06F 9/44536
See application file for complete search history.

(56) References Cited

U.S. PATENT DOCUMENTS

| | | | |
|---|---|---|---|
| 6,711,447 B1 * | 3/2004 | Saeed | G06F 1/324 713/340 |
| 10,185,384 B2 * | 1/2019 | Sharda | G06F 1/32 |
| 12,126,458 B1 * | 10/2024 | Pillai | H04L 43/20 |
| 2005/0049818 A1 * | 3/2005 | Liang | G06F 1/206 702/132 |
| 2005/0182986 A1 * | 8/2005 | Anderson | G06F 1/3296 713/340 |
| 2012/0072746 A1 * | 3/2012 | Sotomayor | G06F 1/3243 713/320 |
| 2013/0290751 A1 * | 10/2013 | Mondal | G06F 1/324 713/320 |
| 2015/0084423 A1 * | 3/2015 | Gamborg | H02J 9/06 307/64 |

(Continued)

*Primary Examiner* — Xuxing Chen
(74) *Attorney, Agent, or Firm* — Amin, Turocy & Watson, LLP

(57) ABSTRACT

Various systems and methods are presented herein regarding controlling operation of central processing units (CPUs) to reduce power consumption at a data center(s). A first subset of CPUs located on a computer system can be operationally adjusted while a second subset of CPUs can be designated as having to be available at all times with a default operating condition (e.g., to run background operations). As operational demand placed on the computer system reduces, operation of the first subset of CPUs can be throttled back (e.g., clock speed reduced) while the second subset of CPUs remain at the default operating condition. As operational demand subsequently increases respective CPUs in the first subset of CPUs can have their operating condition (e.g., clock speed) increased. By adjusting the operating condition of one or more CPUs, power consumption at the data center can be reduced during periods of low operational demand.

20 Claims, 13 Drawing Sheets

(56) References Cited

U.S. PATENT DOCUMENTS

2017/0220362 A1* 8/2017 Jenne .................. G06F 1/26
2019/0086982 A1* 3/2019 Priyadarshi ........... G06F 1/3206
2020/0218676 A1* 7/2020 Cao ................... G06F 9/5027

* cited by examiner

STORAGE ARRAY POWER THROTTLING

BACKGROUND

The subject disclosure relates to data centers, and more specifically controlling operation of central processing units (CPUs) to reduce power consumption at a data center(s).

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, devices, computer-implemented methods, methods, apparatus and/or computer program products are presented that facilitate automatically adjusting operation of one or more CPUs to reduce power consumption of a computer system.

According to one or more embodiments, a system is provided to configure operation of one or more CPUs to reduce power consumption of the CPUs. The system can comprise at least one processor, and a memory coupled to the at least one processor and having instructions stored thereon, wherein, in response to the at least one processor, the instructions facilitate performance of operations. The operations can comprise monitoring demand data representative of an operational demand of a collection of central processing units (CPUs) located in a system, wherein the operational demand relates to at least one workload to be processed by the system, and further adjusting at least one parameter of at least one configuration of at least one CPU in the collection of CPUs, the at least one CPU having been determined to be available to satisfy the operational demand.

In an embodiment, the operations can further comprise determining whether a first operational demand represented by first operational demand data is below a performance threshold, and in response to a determination that the first operational demand is below the performance threshold, throttling operation of a first CPU in the collection of CPUs. In an embodiment, the throttling operation of the first CPU can comprise reducing a clock speed of the first CPU from a current clock speed to a minimal clock speed, wherein the minimal clock speed has a frequency less than the current clock speed.

In a further embodiment, the operations can further comprise determining whether a second operational demand represented by second operational demand data is below the performance threshold, and in response to a determination that the second operational demand is not below the performance threshold, increasing a clock speed of the first CPU from a minimal clock speed to a higher clock speed, wherein the higher clock speed has a frequency higher than the minimal clock speed.

In another embodiment, the operations can further comprise in response to the determination that the first operational demand is below the performance threshold, maintaining operation of a second CPU in the collection of CPUs at a specified clock speed currently used by the second CPU. In an embodiment, the second CPU can be assigned to a first subset of CPUs in the collection of CPUs, wherein the first subset of CPUs is required to operate using the specified clock speed.

In a further embodiment, the operations can further comprise determining whether a third operational demand represented by second operational demand data is below the performance threshold, and further, in response to a determination that the third operational demand is below the performance threshold, throttling operation of the first CPU and a second CPU in the collection of CPUs, wherein the throttling operation of the first CPU adjusts the clock speed of the first CPU to a first clock speed, wherein the first clock speed is a minimal clock speed, wherein the throttling operation of the second CPU adjusts the clock speed of the second CPU to a second clock speed, wherein the second clock speed has a frequency between the minimal clock speed and the specified clock speed, and maintaining operation of the second CPU at the second clock speed.

In an embodiment, the system can be any of a data server, a data center, a storage system, a database system, or a client computing system. In a further embodiment, the minimal clock speed can be between 0.9 gigahertz (GHz) and 1.1 GHZ, and the specified clock speed can be between 2.0 GHz and 2.8 GHz.

In a further embodiment, the operations can further comprise determining the performance threshold based on at least one of a time of operation applicable to the system, first electrical power available during off-peak energy demand via energy provider devices associated with an energy provider provisioning energy to the system, second electrical power available during peak energy demand via the energy provider devices associated with the energy provider, or a volume of computing operations to be performed by the system at a specified time or predicted to be performed by the system during a specified time range.

In other embodiments, elements described in connection with the disclosed systems can be embodied in different forms such as computer-implemented methods, computer program products, or other forms. In an embodiment, the computer-implemented method can comprise monitoring, by a device comprising a processor, operational demand of a collection of CPUs located in a system, wherein the operational demand relates to one or more workloads to be processed by the system, and adjusting, by the device, a number of CPUs in the collection of CPUs available to facilitate satisfaction of the operational demand.

In a further embodiment, the computer-implemented method can further comprise determining, by the device, a first operational demand relative to a performance threshold; and in response to a determination that the first operational demand is below the performance threshold: throttling, by the device, first operation of a first subset of CPUs in the collection of CPUs to adhere to a first operating condition, wherein the first operating condition is less than a default operating condition; and maintaining, by the device, second operation of a second subset of CPUs in the collection of CPUs to adhere to a second operating condition, wherein the second operating condition is the default operating condition.

In an embodiment, the first operating condition can be a clock speed frequency of between about 0.9 gigahertz (GHz) and about 1.1 GHz, and the second operating condition can be a clock speed frequency of between about 2.0 GHz and about 2.8 GHz. In another embodiment, the performance threshold can be based on at least one of a time of operation of the system, first electrical power available during off-peak energy demand via an energy provider system provisioning energy to the system, second electrical power available during peak energy demand via the energy provider system, or a volume of computer operations to be performed by the system at a given time.

In a further embodiment, the computer-implemented method can further comprise determining, by the device, a second operational demand relative to a performance threshold, wherein the second operational demand is subsequent to the first operational demand; and in response to a determination that the second operational demand is above the performance threshold: adjusting, by the device, the first operation of the first subset of CPUs in the collection of CPUs to adhere to a third operating condition, wherein the third operating condition is the default operating condition; and maintaining, by the device, the second operation of the second subset of CPUs in the collection of CPUs to adhere to the second operating condition.

Another embodiment can further comprise a computer program product stored on a non-transitory computer-readable medium and comprising machine-executable instructions, wherein, in response to being executed, the machine-executable instructions cause computing equipment to perform operations, comprising monitoring a first operating condition of a data server; comparing the first operating condition to a threshold value; and in response to a result of the comparing being determined to be that the first operating condition is below the threshold value: maintaining first operation of a first subset of CPUs at a normal operating condition; and adjusting second operation of a second subset of CPUs at a lower limit applicable to operating condition, wherein the lower limit applicable to operating condition is a first clock speed and the normal operating condition is a second clock speed, wherein the first clock speed is less than the second clock speed.

In a further embodiment, the operations can further comprise monitoring a second operating condition of the data server, wherein the second operating condition has manifested subsequent to the first operating condition. In another embodiment, the operations can further comprise comparing the second operating condition to the threshold value, and in response to a result of the comparing of the second operating condition to the threshold value being determined to be that the second operating condition is above the threshold value: further maintaining the first operation of the first subset of CPUs at the normal operating condition, and adjusting an operation of a first CPU in the second subset of CPUs to the normal operating condition; and maintaining the second operation of a second CPU in the second subset of CPUs at the lower limit applicable to operating condition.

In an embodiment, the lower limit applicable to operating condition can be specified to be a clock speed frequency between 0.9 gigahertz (GHz) and 1.1 GHZ, and wherein the normal operating condition can be specified to be a clock speed frequency of between 2.0 GHz and 2.8 GHz. In an embodiment, the threshold value can be determined based on at least one of a time of operation of the data server, first electrical power available to the data server during a defined off-peak energy demand time period, second electrical power available to the data server during a defined peak energy demand time period, or a volume of computer operations to be performed by the data server at a defined time.

In another embodiment, the operations can further comprise applying a first policy configured to control the first operation of the first subset of CPUs; and applying a second policy configured to control the second operation of the second subset of CPU.

DESCRIPTION OF THE DRAWINGS

One or more embodiments are described below in the Detailed Description section with reference to the following drawings.

DETAILED DESCRIPTION

Figure 1A:
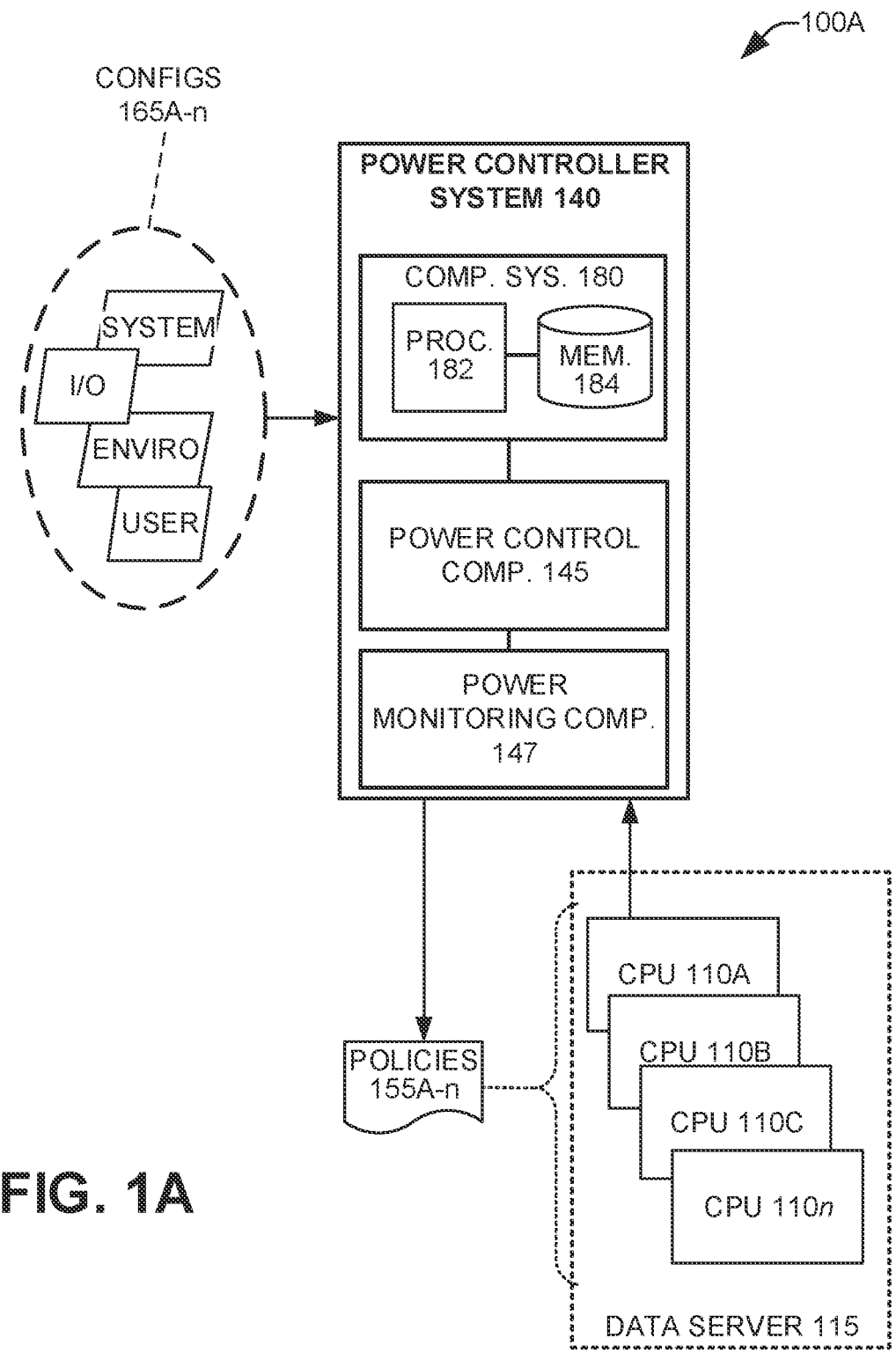
FIG. 1A illustrates a system that can be utilized to respectively control operation of CPUs to reduce energy consumption of a data server, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Ranges A-n are utilized herein to indicate a respective plurality of devices, components, statements, attributes, etc., where n is any positive integer.

The various embodiments presented herein can be implemented in a data center environment to facilitate improving the energy and operational efficiency of one or more digital operations (also known as workloads) occurring at a data center, to reduce energy consumption at the data center and, accordingly, reduce a carbon footprint(s) of operations performed at the data center.

The term workload(s) is used herein to convey the various activities associated with processing/hosting data (e.g., in a digital format, code, information) at one or more data centers and the various operations, processes, workflows, computations, analytics, algorithm execution, maintaining, updating, and the like, performed on the data as a function of a client's activity regarding the data. Workload activities can range, for example, from storing and maintaining data on a data server, through to executing algorithms to analyze and/or modify the data (e.g., as a function of operations performed at a data center and/or remotely), transmission of data, receiving one or more instructions regarding processing of the data, updating data, replicating data, and the like.

Conventionally, to reduce energy consumption of a data center, operation of respective CPUs can be adjusted/throttled such that, for example, CPUs operating on a data server are collectively throttled from a high-performance operation (e.g., normal operation) to a low performance operation (e.g., a minimal operation). The change in operation can be directed to throttling clock speed of a CPU, for example. However, this conventional approach does not load balance operation of the CPUs in accordance with the operational requirements present at the data server at any given moment. The conventional approach is effectively a binary operation across the entire array of CPUs. For example, where 48 CPUs are in operation at a data server, the 48 CPUs are collectively throttled to be either in normal, high-performance operation or in minimal, low performance operation. Further, a processor frequency governor can reside and be utilized on a CPU to throttle the CPU to improve processing at the CPU, whereby the throttling is governed from within the CPU architecture.

In an example scenario of operation, per the various embodiments presented herein, normal (also referred to herein as "default") performance operation of a CPU can be anywhere from about 2.0 and about 2.8 GHz (e.g., 2.4 GHz), while minimal performance operation (also referred to herein as lower limit operation, an operation applicable to a determined demand/workload(s)/operating condition, etc.) can be between about 0.9 and about 1.1 GHz, (e.g., 1.0 GHz), with operation of a CPU being throttled therebetween as required. It is to be appreciated that the respective operational/clocking frequencies presented are merely examples of clocking frequency, and any clocking frequency can be utilized in accordance with the operation configuration/limitation of a respective CPU. The higher the clocking speed, the greater the processing power/performance, but also the greater the energy requirement for operation of a CPU and/or associated systems/components. Clock rate/clock speed generally refers to a frequency at which a clock generator of a CPU generates pulses, whereby the pulses are utilized to synchronize one or more operations performed by the CPU and any components (e.g., internal, or external, to the CPU) operating in association with the CPU. Adjusting clock speed of a CPU can also affect energy consumption of other components/devices associated with a data server, such as memory operation (e.g., read/write operations), cooling fan operation, system line cards (SLICs), and disk operation. Per the various embodiments presented herein, a CPU operating with a normal clocking speed (e.g., per manufacturer's specification) can be "underclocked" to a slower/minimal clock speed, and further have the clock speed increased from a low/slow clock speed (e.g., minimal frequency, an intermediate frequency between the minimal frequency and the normal frequency) back to the normal clock speed/frequency, or "overclocked" to a clocking speed greater than the manufacturer's specification.

Per the various embodiments presented herein, respective CPUs (e.g., in a group/collection/series/subset of available CPUs) can be isolated with operation of the respectively isolated CPUs being individually throttled. As further described, throttling of a CPU can be performed/controlled based on applying a policy to the respective CPU, wherein a policy can indicate whether a CPU is to transition from a normal clock speed to a minimal clock speed (or an intermediate clock speed), and vice versa. In a further embodiment, owing to one or more operational requirements (e.g., background operations that must remain available and/or performant at all times) of a particular CPU, a CPU may not be available for throttling and has to remain operational with the normal clock speed, e.g., as identified in a policy pertaining to that CPU. In an embodiment, the one or more CPUs that cannot be operationally throttled can be grouped under a single policy. In another embodiment, CPUs in a subset of CPUs that have been identified as being available to be throttled, the CPUs can be throttled to different operating conditions to meet an operational demand, for example, a subset of CPUs comprises ten CPUs. Under a first operational demand, the ten CPUs can be throttled to a minimal operation (e.g., 1 GHz), while under a subsequent, second operational demand, six of the ten CPUs can remain at minimal operation while the remaining four of the ten CPUs can be throttled to an intermediate operating condition between the minimal operation and the normal operation (e.g., the four CPUs are throttled to 1.8 GHZ). Under a subsequent, third operational demand, the ten CPUs can all be throttled to the intermediate operating condition of 1.8 GHz. Accordingly, the number of CPUs and their respective operating condition can be throttled as needed to a particular operating condition, hence, the various embodiments presented herein extend the binary approach of a conventional system, to a system whereby the respective/individual CPUs can be functioning over a range of operating conditions.

As further described, adjustment of operation of the respective CPUs can be initiated by various methods. For example, in a first scenario of operation, the clocking speed of the respective CPUs can be adjusted in accordance with a requirement received in a configuration implemented/to be implemented at the data server. For example, a configuration is implemented at a particular time (e.g., 8 PM), whereby operation of the respective CPUs is automatically adjusted in accordance with the requirement, whereby the requirement can function as operational demand data. In a second example of operation, a configuration can be received indicating that a high workload volume is likely to occur at a particular time (e.g., batch processing/upload of data) and operation of the CPUs is to be ramped up at that time (e.g., clock speed increased). In a third example of operation, the CPU power control system can be configured to monitor the volume of workloads present at the data server and adjust (e.g., in real time) operation of the CPUs to meet the operational demand placed on the data server by the workloads. In an aspect, the volume of workloads/operational demand data can be obtained as a function of an operational status of the respective CPUs. Operational demand currently placed/to be placed on a data server can include, in a non-limiting list, any of (a) a time/user based configuration, (b) based on workload at a data server, (c) power constraint based, and suchlike. In a further aspect, the operational status of the respective CPUs can be compared to one or more performance thresholds, whereby the performance threshold can be generated based on a requirement in a configuration. The current/future operation of the CPUs can be compared with the performance threshold and in response to determining that (a) the current operating status of the CPUs is below the performance threshold, operation of one or more CPUs can be increased (e.g., clock speed increased), and/or (b) the current operating status of the CPUs is above the performance threshold, operation of one or more CPUs can be reduced (e.g., clock speed reduced).

It is to be appreciated that while the various embodiments presented herein relate to adjusting operational performance of CPUs as a function of their respective clocking speed, the scope of the embodiments are not so limited and pertain to any associated parameter relating to reducing energy consumption of a data server environment, a data server, a CPU, and suchlike. Further, while the various embodiments presented herein relate to improving the energy efficiency of a data server, the various embodiments can be equally applied to any computer system comprising a collection of components (e.g., CPUs) that can be adjusted with regard to operational performance. Furthermore, while the various embodiments are presented with regard to one or more CPUs, the various embodiments can be applied to one or more CPU cores located at a CPU. Accordingly, the various embodiments can be directed to controlling operation of a group of CPUs as well as further controlling a group of cores located on a particular CPU (e.g., within the group of CPUs). Further, the various embodiments can be directed to controlling operation of CPUs, cores, etc., located in any of a data server, a data center, a storage system, a database system, a client computing system, and suchlike.

Turning now to the drawings, FIG. 1A illustrates a system 100A that can be utilized to respectively control operation of CPUs to reduce energy consumption of a data server, in accordance with one or more embodiments. System 100A comprises a group of CPUs 110A-n communicatively coupled to a power control system (PCS) 140. In an example scenario, the CPUs 110A-n can be located/operating in a data server 115 (e.g., a storage array). As further described, the PCS 140, and included components, can be configured to control operation, e.g., respective clocking speeds, of the individual CPUs 110A-n. The group of CPUs 110A-n can be respective CPUs communicatively coupled within a single data server/computer or a collection of data servers/computers, as assigned to a PCS 140. As further described, the CPUs 110A-n can be logically segmented into groups/subsets of CPUs, e.g., based upon an operational demand/requirement(s) placed on the data server 115 and the CPUs 110A-n included therein.

As shown, the PCS 140 can include a power control component (PCC) 145, wherein the PCC 145 can be configured to control operation (e.g., clock speed) of the respective CPUs 110A-n. PCC 145 can be configured to control operation of the respective CPUs 110A-n by utilizing policies 155A-n. For example, the policies 155A-n can be utilized to control clocking speed of one or more of the CPUs 110A-n. As further shown, the PCS 140 can be configured to receive various configurations (inputs) 165A-n, wherein the configurations 165A-n can be directed towards operational requirements/concerns such as environmental, system, user, input/output (I/O) requirements, etc. Based on the respective requirements in the configurations 165A-n, the PCC 145 can utilize the one or more policies 155A-n to control operation of the respective CPUs 110A-n. In an aspect, the respective requirements in the configurations 165A-n can be considered to function as operational demand data. As further described, based on a current configuration 165A-n, or a subsequently received configuration 165A-n, the policies 155A-n can be subsequently applied/updated to further control current/future operation of the CPUs 110A-n in accordance with the configurations 165A-n. Accordingly, the one or more requirements included in the configurations 165A-n can be considered to represent an operational demand placed on the data server 115. As respective configurations 165A-n are received/implemented, the operational demand placed on the data server 115 and the respective CPUs 110A-n changes accordingly. Further, as operational demand changes from one configuration (e.g., configuration 165A) to the next (e.g., subsequently implemented configuration 165B), e.g., from a daytime period of high workload activity to a nighttime period of low workload activity, respective policies (e.g., first policy 155A and a second policy 155B) are generated by the policy component 150 (as further described) based on the requirement(s)/operational demand data included in the respective configurations 165A-n, whereupon the policies 155A-n are implemented (e.g., by the PCC 145 and/or policy component 150) and operation of the respective CPUs 110A-n adjusted accordingly in response to the requirement(s)/operational demand data in the configurations 165A-n.

PCS 140 can further include a power monitoring component 147 configured to monitor operation of CPUs 110A-n, e.g., with regard to clocking speed. The clock speed information generated by the power monitoring component 147 can be utilized in a various ways. For example, in an embodiment, the power monitoring component 147 can be configured to determine and report the respective clocking speed (e.g., a status) of CPUs 110A-n of concern, e.g., CPU 110F is operating with a normal clock speed, CPU 110M is operating with minimal clock speed, CPU 110R is operating with an intermediate clock speed, and suchlike. In another embodiment, PCC 145 can utilize the clocking speed data generated by the power monitoring component 147 to determine whether the respective CPU is operating in accordance with a policy 155A-n (as further described). In a further embodiment, PCC 145 can utilize historical clocking speed data generated by the power monitoring component 147 to determine (e.g., in real time) whether an operational demand placed on the data server 115 is increasing/decreasing, and adjust the operating condition of respective CPUs 110A-n to meet an anticipated demand.

As shown in FIG. 1A, PCS 140 can include a computing system 180 comprising a processor 182 and a memory 184, wherein the processor 182 can execute the various computer-executable components, functions, APIs, operations, etc., presented herein. The memory 184 can be utilized to store the various computer-executable components, APIs, functions, code, etc., as well as information regarding CPUs 110A-n, policies 155A-n, thresholds 157A-n, groups/subsets 158A-n, and suchlike (e.g., in a lookup table 177, as further described).

The PCS 140 can be located in a single datacenter, distributed across multiple datacenters, located in the "cloud" (e.g., a cloud-based analytics system, a cloud computing-based resource, and the like), an edge computing system, and the like. It is to be appreciated that while in FIG. 1A PCS 140 is depicted as being external to data server 115, PCS 140 can be included/operate from within the data server 115, e.g., PCS 140 is a data server 115 subsystem.

Figure 1B:
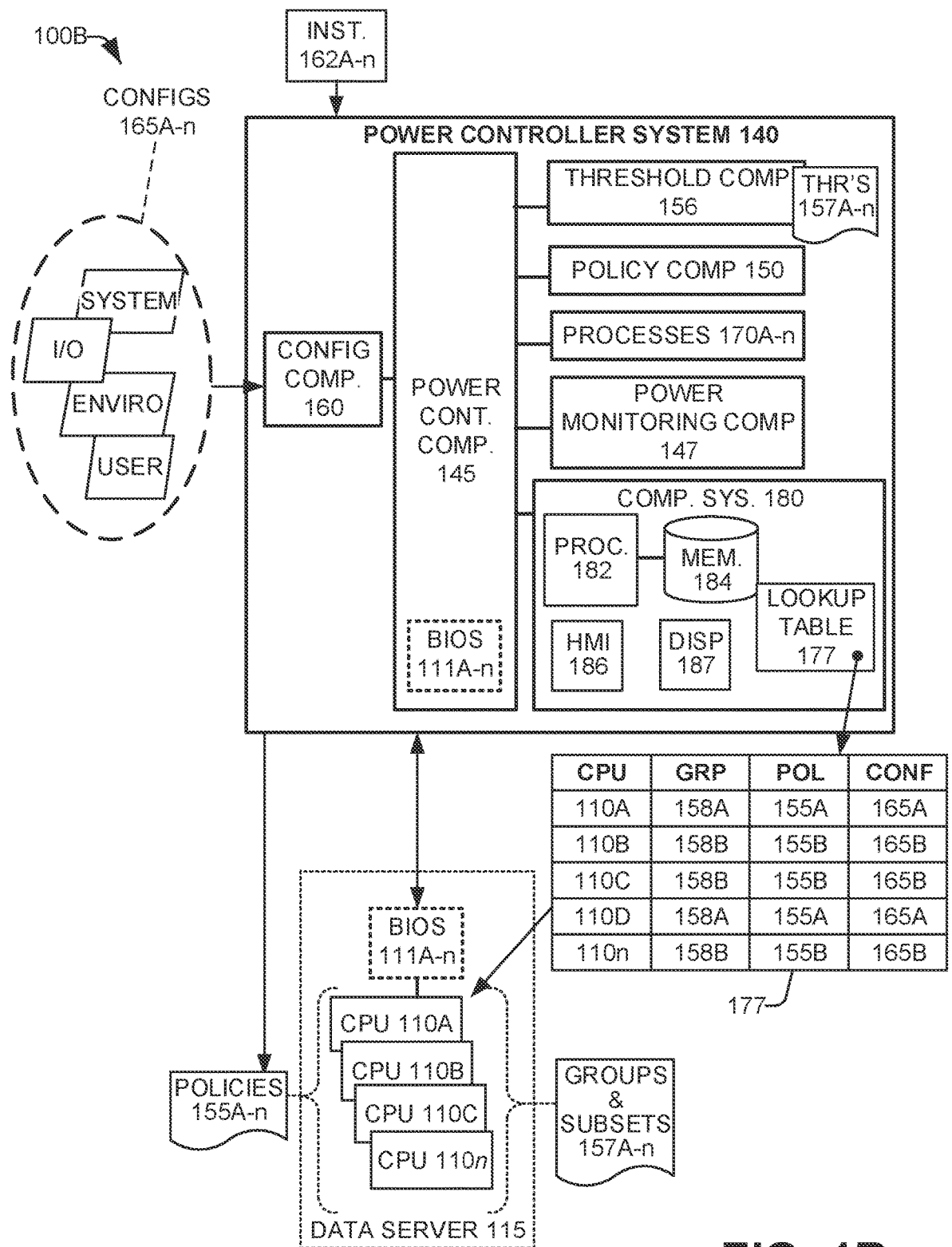
FIG. 1B further expands on the components, etc., presented in the system depicted in FIG. 1A, which can be utilized to respectively control operation of CPUs to reduce energy consumption of a data server, in accordance with one or more embodiments.

FIG. 1B presents system 100B, which further expands on the components, etc., presented in system 100A which can be utilized to respectively control operation of CPUs to reduce energy consumption of a data server, in accordance with one or more embodiments. As shown, and previously mentioned per system 100A, system 100B comprises a collection of CPUs 110A-n communicatively coupled to the PCS 140. As further described, the PCS 140 and the PCC 145 can be configured to control operation, e.g., respective clocking speeds, of the individual CPUs 110A-n, wherein PCC 145 can adjust operation of CPUs 110A-n in a deterministic manner to maintain system performance, as required. By utilizing policies 155A-n, PCC 145 can be configured to control operation of the respective CPUs 110A-n, e.g., in accordance with one or more requirements in configurations 165A-n (and instructions 162A-n, as further described). Any suitable configuration/requirement can be applied to PCS 140, such as:

i) environmental requirements: pertaining to constraints of the power grid/network providing power to the data center/data server may limit available power at a given time, variation in energy demand to accommodate peak and/or off-peak demand, etc.

ii) system requirements: pertaining to accommodate high demand of the data server (e.g., CPUs are to operate at normal clock speed), low demand/idle time (e.g., one or more CPUs can operate with a minimal clock speed), low load prediction, intermediate operation (e.g., one or more CPUs can operate with an intermediate clock speed), etc.

iii) user requirements: pertaining to such issues as desired lower power operation, off hours scheduling (e.g., evenings, weekends), etc.

iv) I/O requirements: pertaining to background operations that have to be maintained (e.g., receipt and processing of data received from an external source), and suchlike.

As shown in FIG. 1B, the PCS 140 can further include a configuration component 160, wherein the configuration component 160 can be configured to receive the various configurations 165A-n, and further store the various configurations 165A-n (e.g., in memory 184). As further shown, the PCS 140 can further include a policy component 150, wherein the policy component 150 can be configured to implement the one or more policies 155A-n to control operation of the CPUs 110A-n. In an embodiment, the policy component 150 can be configured to parse and review the configurations 165A-n to determine/identify one or more operational requirements included in the configurations 165A-n. The policy component 150 can be further configured to monitor operation of any of the CPUs 110A-n in accordance with a respectively assigned policy 155A-n.

The CPUs 110A-n can be logically segmented into groups/subsets of CPUs, e.g., based upon use of the respective CPUs 110A-n in the data server 115. Accordingly, a first subset of CPUs 110A-n can be assigned/identified with an operation that cannot be adjusted, such that the performance characteristics/operating conditions and/or system operation workloads associated with the first subset of CPUs 110A-n must be maintained, whereby the first subset of CPUs 110A-n can be assigned to a first policy 155A. Effectively, the first subset of CPUs is to be available at all times with a normal/default configuration implemented thereon.

Further, a second subset of CPUs 110A-n can run/execute workloads that can be adjusted in terms of the time taken/ availability to perform the workload. The second subset of CPUs 110A-n can be assigned to a second policy 155B, wherein the second policy 155B can have an adjustable level of CPU operation, e.g., from/between a nominal clock frequency of operation through to a minimal clock frequency of operation.

Effectively, the first subset of CPUs 110A-n are in a first policy group (e.g., associated with first policy 155A) and the second subset of CPUs 110A-n are in a second policy group (e.g., associated with second policy 155B). Any number of subsets of CPUs 110A-n and associated policies 155A-n can be utilized.

As shown in FIG. 1B, PCS 140 can further include a process component and various processes 170A-n. In an embodiment, the processes 170A-n can include one or more artificial intelligence (AI) and machine learning (ML) operations configured to:

A) operate in conjunction with the policy component 150 to automatically identify one or more requirements in configurations 165A-n, wherein the policy component 150 can be configured to automatically generate one or more policies 155A-n in accordance with the one or more requirements identified in configurations 165A-n.

B) operate in conjunction with the PCC 145 to automatically identify one or more requirements in instructions 162A-n (as further described) regarding operation of CPUs 110A-n (e.g., grouping of a CPU into a first subset of CPUs that cannot be power throttled, grouping of a CPU into a second subset of CPUs that can be throttled, etc.).

C) operate in conjunction with the power monitoring component 147 to identify a future reduction in operational demand of the data server 115, and further predict when the operational demand at the data server 115 is going to be below a particular threshold 157A-n (also known as a performance threshold), such that the respective CPUs 110A-n can have their respective clocking speed throttled. As further described, a performance threshold 157A-n can be based on, for example, any of a time of operation applicable to the system, first electrical power available during off-peak energy demand via energy provider devices associated with an energy provider provisioning energy to the system, second electrical power available during peak energy demand via the energy provider devices associated with the energy provider, volume of computing operations to be performed by the system at a specified time or predicted to be performed by the system during a specified time range, as conveyed as a requirement in a configuration 165A-n.

In an embodiment, PCS 140 can further include a human-machine interface (HMI) 186 which can be configured to receive an instruction 162A-n (e.g., a configuration input received from a human operator), wherein an instruction 162A-n can establish/identify respective groups/subsets of CPUs 110A-n (a) for which various policies 155A-n can be applied to. With a subset of CPUs 110A-n identified in a given instruction 162A-n, a policy 155A-n can be assigned to the subset of CPUs 110A-n, whereby operation/throttling of the respective subset of CPUs 110A-n can be performed in accordance with one or more requirements in a configuration 165A-n. In an embodiment, a configuration 165A-n can be reviewed (e.g., by a human operator) and an instruction 162A-n applied to the PCS 140 identifying which CPUs 110A-n are to be throttled to meet the requirement(s) in a configuration 165A-n, whereby the policy component 150 can generate the respective policy 155A-n based thereon. In another embodiment, the one or more processes 170A-n/PCC 145 can automatically review the configuration 165A-n and based on various criteria (e.g., certain CPUs 110A-n have to remain operational with a normal clocking speed, placed in a first group/subset 158A-n) can generate policies 155A-n indicating which CPUs 110A-n can be throttled (e.g., placed in a second group/subset 158B) and when, e.g., in accordance with an operational threshold 157A-n.

HMI 186 can include an interactive display 187 to present the various information via various screens presented on the display 187/HMI 186. The HMI 186 can be further configured to receive the respective configurations 165A-n, wherein the configurations 165A-n can be processed/parsed by the configuration component 160. As mentioned, the configurations 165A-n can include configurations regarding when a respective CPU 110A-n can be throttled, e.g., as a function of any configuration 165A-n, e.g., environmental, system, user, I/O, and suchlike.

As shown in FIG. 1B, PCS 140 can further include a lookup table/database 177. In an embodiment, the PCC 145 can be configured to populate lookup table 177 with information (e.g., as configured in instructions 162A-n) regarding any of the CPUs 110A-n, such as groups/subsets 158A-n to which the respective CPU 110A-n has been assigned, a policy 155A-n assigned to any of the CPUs 110A-n and/or the groups/subsets 158A-n, one or more configurations 165A-n applied to the respective CPU 110A-n, and suchlike. The lookup table 177 can be stored in any suitable location, e.g., in memory 184. As further described, the example lookup table 177 presented in FIG. 1B has CPUs 110A and 110D assigned to subset 158A to which a policy 155A has been assigned. Further, CPUs 110B, 110C, and 110n have been assigned to subset 158B to which a policy 155B has been assigned. Subset 158A can comprise those CPUs 110A-n which cannot be operationally adjusted, e.g., as established by policy 155A. Subset 158B can comprise those CPUs 110A-n which can be operationally throttled, e.g., as established by policy 155B.

As previously mentioned, and as further shown in FIG. 1B, PCS 140 can include a power monitoring component 147, as well as a threshold component 156 and thresholds 157A-n. The thresholds 157A-n can be determined based on the requirements/configurations present in the configurations 165A-n, e.g., as parsed by the configuration component 160. For example, a first threshold 157A can be configured with regard to a date/time requirement in a user-related configuration 165U at which one or more CPUs 110A-n can be throttled, e.g., between the hours of 8 PM-5 AM nightly, over the weekend (between Friday 8 PM and 5 PM Monday), and suchlike, and during these times reduce operation of the CPUs 110A-n in accordance with policy 155A. In another example, a second threshold 157B can be configured regarding whether the current workload demand at the data server 115 is below a particular level/capacity of operation? (e.g., 60% of operational maximum capacity), if so, then reduce operation of CPUs 110A-n accordance with policy 155B. As previously mentioned, particular CPUs 110A-n (e.g., a first subset 158A of CPUs 110A-n) are to remain fully operational regardless of the operating condition(s) at the data server 115 (e.g., in accordance with/as defined in a first policy 155A), while another group of CPUs 110A-n (e.g., a second subset 158B of CPUs 110A-n) can be throttled as a function of the operating condition(s) at the data server 115 (e.g., in accordance with/as defined in a second policy 155B). As mentioned herein, the number of policies 155A-n, the thresholds 157A-n configured to trigger/cease throttling of one or more CPUs 110A-n, the respective configurations 165A-n and the requirements they contain, the instructions 162A-n and the requirements they contain, etc., can be as simple or as complex as desired to achieve power throttling of CPUs 110A-n (e.g., while minimizing impact on operations/workloads performed at a data server 115).

In an example of implementation, a policy 155X can be configured to be applied in response to an instruction 162X/configuration 165X of normal operation of data server 115, such that implementation of policy 155X by PCC 145 supersedes all other policies 155A-n. Policy 155X can include the instruction that power throttling of the CPUs 110A-n is disabled, with all of the respective groups/subsets 158A-n of CPUs 110A-n to be returned to normal operation (e.g., normal clocking speed utilized at all of the CPUs 110A-n), until a different operating condition is implemented. While policy 155X is implemented, the data server 115 is operating under normal power consumption across all CPUs 110A-n. Furthering the example, an instruction 162Y/configuration 165Y can be received such that the data server 115 is to be throttled, wherein a policy 155Y can be configured in response to the instruction 162Y/configuration 165Y, such that implementation of policy 155Y by PCC 145 now supersedes policy 155X, with a first subset 158X of CPUs 110A-n operating at a normal clock rate and a second subset 158Y of CPUs 110A-n are operationally throttled, e.g., to a minimum clock rate.

As shown in FIG. 1B, a BIOS 111A-n (basic input/output system) can be utilized to respective operation of the respective CPUs 110A-n, as further described below with reference to FIG. 2.

Figure 2:
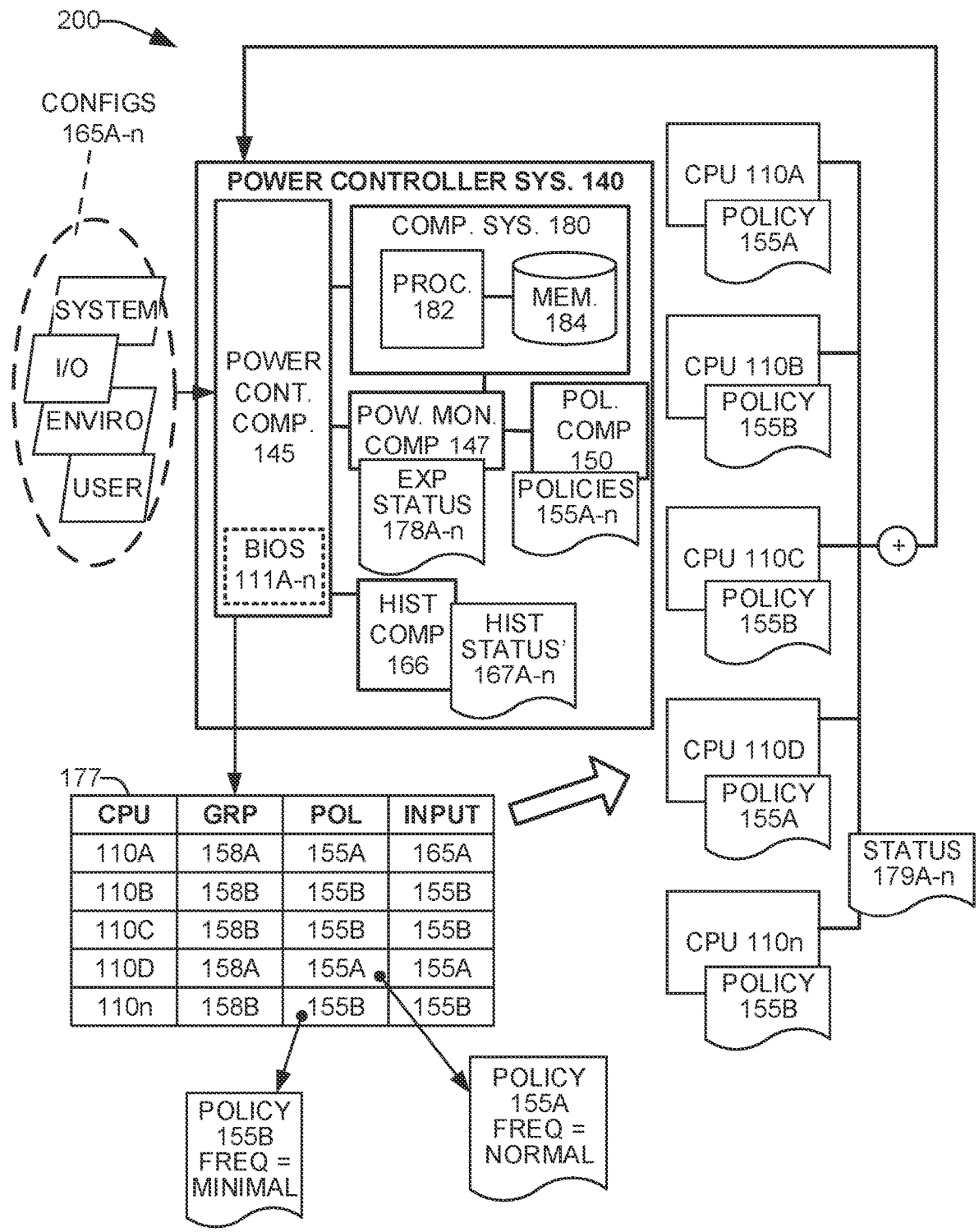
FIG. 2 illustrates a system, wherein a series of policies have been assigned to respective CPUs to enable power throttling of the CPUs, in accordance with an embodiment.

FIG. 2 illustrates system 200, wherein a series of policies have been assigned to respective CPUs to enable power throttling of the CPUs, in accordance with an embodiment. As shown, and previously mentioned per FIGS. 1A and 1B, various CPUs 110A-n have been assigned respective policies 155A and 155B. In an embodiment, policy 155A can be a policy whereby the clocking frequency of the respective CPU 110A-n cannot be altered/adjusted/throttled. In the example presented in FIG. 2, CPUs 110A and 110D (e.g., a first subset 158A of CPUs 110A-n) have been identified (e.g., by PCC 145, policy component 150, and/or processes 170A-n) as being associated with system operation workloads (e.g., per instructions 162A-n) that are to be maintained and available at the normal frequency of operation. Accordingly, the non-adjustable (non-throttle) policy 155A is assigned (e.g., by PCC 145) to both CPUs 110A and 110D such that regardless of a current or future operational condition of the data server 115 comprising the CPUs 110A and 110D, policy 155A prevents a reduction in the operational condition of CPUs 110A and 110D.

In another embodiment, policy 155B can be a policy whereby the clocking frequency of the respective CPU can be altered/adjusted/throttled. In the example presented in FIG. 2, CPUs 110B, 110C, and 110n (e.g., a second subset 158B of CPUs 110A-n) have been identified (e.g., by PCC 145, policy component 150, and/or processes 170A-n) as being associated with system operation workloads (e.g., per instructions 162A-n) that can be adjusted to enable a reduction in energy consumption of the data server 115, hence, CPUs 110B, 110C, and 110n can be operationally throttled. Accordingly, the adjustable (throttleable) policy 155B is assigned (e.g., by policy component 150 and/or PCC 145) to CPUs 110B, 110C, and 110n such that, with adjustment/ variation in a current or future operating condition of the data server 115 comprising the CPUs 110B, 110C, and 110n, policy 155B enables an adjustment in the operational condition of CPUs 110B, 110C, and 110n, e.g., between a normal clock speed (e.g., 2.4 GHz) and a minimal clock speed (e.g., 1 GHZ).

As further shown in FIG. 2, as the respective clock speeds of the throttleable CPUs 110A-n are adjusted, the overall energy usage of the CPUs 110A-n can be monitored to determine the overall power consumption of the CPUs 110A-n.

In an embodiment, rather than being a binary operation whereby the non-adjustable CPUs 110A and 110D continually remain in the normal operating condition and the adjustable CPUs 110B, 110C, and 110n collectively adjust between the normal operating condition and the minimal operating condition, a subset of the adjustable CPUs 110A-n can be gradually brought up to nominal clock speed, slowed to the minimal clock speed, and/or operated at an intermediate clock speed.

To convey the concept, three example scenarios are presented. In a first example scenario, the data server 115 is operating at full capacity/high workload, such that all of the CPUs 110A-n are required to operate at the normal clock speed. In a second example scenario, the data server 115 can operate in a low utilization operation such that CPUs 110B, 110C, and 110n can reduce to operate with the minimal clock speed while the non-adjustable CPUs 110A and 110D remain operational at the normal operating condition. In a third example scenario, the data server 115 can be operating with an intermediate level of operation, such that non-adjustable CPUs 110A and 110D remain operational at the normal operating condition, while operation of the adjustable CPUs 110B, 110C, and 110n can be varied to meet the intermediate level of operation requirements, e.g., CPUs 110B and 110n are operating at the minimal clock speed and CPU 110C is ramped up to operate at the normal clock speed. As the operational loading of the data server 115 increases/decreases, the number of adjustable CPUs in any given state of minimal clocking speed, nominal clocking speed, etc., can be increased/decreased (throttled) to satisfy the operational loading/demand. It is to be appreciated that while FIG. 2 illustrates two policies 155A and 155B being utilized, any number of policies 155A-n can be utilized to control respective operating conditions of respective CPUs in CPUs 110A-n. For example, policies 155C and 155D can be utilized to further control operation of the CPUs 110A-n initially being controlled by policy 155B, e.g., policy 155C is subsequently applied (e.g., due to a subsequent change in operational demand) controls operation of CPU 110C and policy 155D controls operation of CPUs 110B and 110n. The number of policies 155A-n implemented and operation of the CPUs 110A-n they respectively control can be configured as the operating conditions/workloads at the data server 115 change/fluctuate.

In an embodiment, the power monitoring component 147 can be configured to monitor operation of the respective CPUs 110A-n with regard to the current operating condition of the respective CPU 110A-n and an anticipated/expected operating condition of the respective CPU 110A-n. For example, is a CPU operating in accordance with a policy 155A-n? The power monitoring component 147 can provide an operational status 179A-n to the PCC 145, whereby the PCC 145 can be configured to adjust performance of a respective CPU 110A-n as required to meet the anticipated/ expected operating condition. In an example embodiment, the operational status 179A-n can indicate the respective clocking speed of the respective CPU 110A-n, As mentioned, the PCC 145 can be configured to adjust the respective clocking speed of a respective CPU. Various ways to adjust the CPU clock speed of a respective CPU 110A-n can involve adjusting the BIOS, adjusting the voltage at the CPU 110A-n, etc., as is known in the art. Accordingly, the PCC 145 can be configured to access the respective BIOS 111A-n associated with each CPU 110A-n of interest to adjust operation of the respective CPU 110A-n, e.g., to either underclock the respective CPU to a slower clock speed, increase the clock speed from a slow clock rate back to the normal clock rate, and/or configure the respective CPU 110A-n with an intermediate clock speed. While FIG. 1B depicts the BIOS 111A-n configuration as being located at the PCC 145, the BIOS 111A-n can be located anywhere in the data server 115, with the PCC 145/PCS 140 communicatively coupled thereto.

As previously mentioned, and as shown in FIG. 2, the power monitoring component 147 can be configured to generate an operational status 179A-n for each of the CPUs 110A-n. In an embodiment, the status' 179A-n can pertain to the clocking speed currently utilized (e.g., per BIOS 111A-n) at each of the CPUs 110A-n, in accordance with the respectively assigned policy 155A-n. Hence, as a policy 155A-n is adjusted/implemented per the configurations 165A-n and/or the instructions 162A-n, the PCC 145 can monitor operation (e.g., via the status' 179A-n and the power monitoring component 147) of the respective CPUs 110A-n and whether the operational status 179A-n is in accordance with the policy 155A-n or to undergo adjustment to meet a required status 179A-n as currently applied or to be applied.

Per an example embodiment, a configuration 165A-n can be received and parsed by the configuration component 160 (e.g., assisted by the processes component 170A-n) to identify respective operational requirements regarding the environment, user, etc. Further, an instruction 162A-n can be received by the PCC 145 and/or the policy component 150 identifying which CPUs 110A-n may/may not be throttled. The PCC 145 can generate a series of subsets 158A-n to capture the respective CPUs 110A-n to be throttled or not. Based on a particular operational requirement (e.g., "throttle CPUs between 8 PM and 6 AM") in a configuration 165A-n, the respective policies 155A-n can be applied to the respective CPUs 110A-n. As mentioned, the respective BIOS 111A-n of each CPU 110A-n can be adjusted (e.g., by the PCC 145) in accordance with an expected operational status 178A-n defined in the respective policy 155A-n, such that a first CPU 110A may be configured to have a normal clock rate (e.g., policy 155A has an expected status 178A of normal frequency), while a second CPU is configured with a minimal clock rate (e.g., policy 155B has an expected status 178B of minimal frequency) and a third CPU is configured with an intermediate clock rate (e.g., policy 155B has an expected status 178C of intermediate frequency), etc. The power monitoring component 147 can be configured to monitor the status 179A-n of the CPUs 110A-n such that (a) in the event of a CPU 110A-n is determined (e.g., by the power monitoring component 147) to not be operating with the desired clock rate (e.g., clock rate in the status 179A-n is less than the clock rate defined as an expected status 178A-n in policy 155A-n), the PCC 145 can be configured to adjust (e.g., via BIOS 111A-n) the clock rate of the respective CPU 110A-n to match the desired clock rate, or (b) in the event of a new policy 155A-n is to be implemented, the PCC 145 can be configured to adjust (e.g., via BIOS 111A-n) the clock rate of the respective CPU 110A-n to match the desired clock rate with the clock required defined in policy 155A-n.

As previously mentioned, operation of CPUs 110A-n can be based on an operational history/future prediction of the CPUs 110A-n. As shown in FIG. 2, the PCS 140 can further include a historian component 166 configured to review historical data in one or more historical status' 167A-n regarding operation of the CPUs 110A-n. Historian component 166 can be configured to operate in conjunction with any of the PCC 145, the power monitoring component 147 and status' 179A-n, processes component and processes 170A-n, threshold component 156, etc. In an embodiment, as the status' 179A-n are generated (e.g., by power monitoring component 147), the status' 179A-n can be saved (e.g., in memory 184) as historical status' 167A-n and reviewed by the historian component 166. Accordingly, based on review of the historical status' 167A-n, the historian component 166 (e.g., in conjunction with processes 170A-n) can be configured to infer a future operational demand placed on the data server 115 as a function of change (e.g., in real time) between the current operational demand (e.g., as deduced from a current status 179C, workloads being processed, etc.) and prior operational history (e.g., as provided in historical status' 167A-n. Hence, rather than simply relying on policies 155A-n as generated by the policy component 150 to control respective operating conditions of the CPUs 110A-n, the PCS 140 can be configured to adjust the operational performance of the respective CPUs 110A-n in real time. Any suitable analysis can be utilized, e.g., the historian component 166 can be configured to review whether a sufficient period of time has elapsed (e.g., status' 179A-n are generated according to a time schedule by the power monitoring component 147) indicating that the operational demand placed on the data server 115 is reducing or increasing. Based on such a determination, the historian component 166 can be configured to instruct the PCC 145 to adjust operation of one or more CPUs 110A-n to meet the inferred increase/reduction in operational demand placed upon the data server 115 (e.g., by various client-generated workloads incident upon the data server 115). Accordingly, PCC 145 can adjust the respective BIOS 111A-n of the respective CPUs 110A-n to meet the inferred demand. The inferred operation can continue, for example, until it is superseded by a policy 155A-n (e.g., policy 155H initiates at a given time), a new configuration 165A-n is received at the PCS 140, a new instruction 162A-n is received at the PCS 140, and suchlike.

Figure 3:
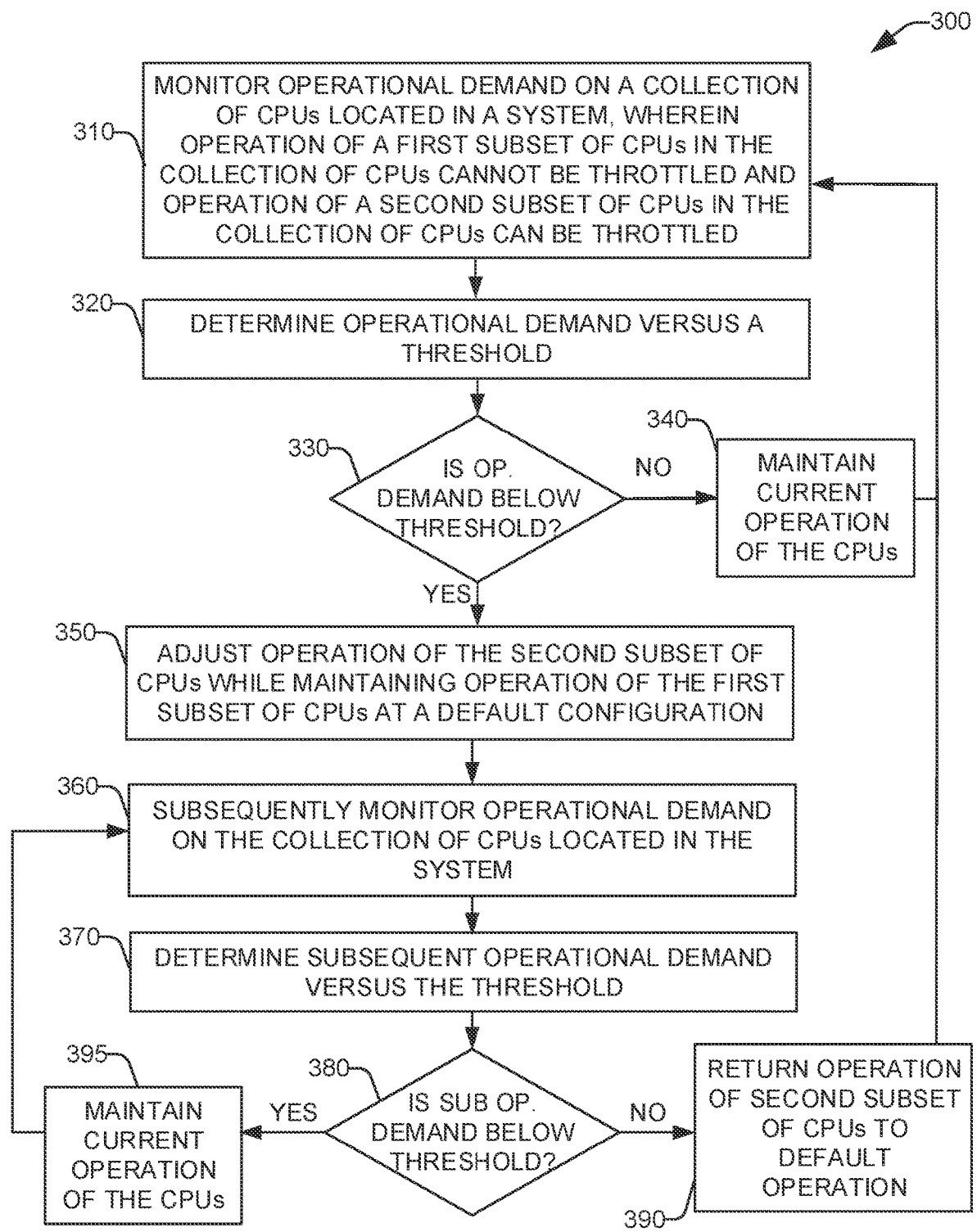
FIG. 3 presents a methodology illustrating a computer-implemented methodology for automatically controlling operation of one or more CPUs to minimize power requirements of a system, according to one or more embodiments.

FIG. 3, methodology 300, illustrates a computer-implemented methodology for automatically controlling operation of one or more CPUs to minimize power requirements of a system, according to one or more embodiments.

At 310, operational demand placed on a system can be monitored. In an embodiment, as previously mentioned, the system can be any of a data server (e.g., data server 115), a data center, a storage system, a database system, a client computing system, and suchlike. In an example implementation, the data server can include a collection of CPUs (e.g., CPUs 110A-n). As previously described, a first subset (e.g., subset 158A) of CPUs in the collection of CPUs may have to remain fully operational to enable one or more operations (e.g., background operations, background workloads) to be performed as/when necessary, hence an operational condition of the first subset of CPUs is unable to be adjusted, such as the clock speed of each of the CPUs in the first subset of CPUs is to remain at a default condition (e.g., a normal clock speed such as, for example, between 2.0-2.8 GHz). A further previously described, a second subset (e.g., subset 158B) of CPUs in the collection of CPUs can be operationally adjusted, for example, the clocking speed of each of the CPUs in the second subset of CPUs can be reduced from a default condition to a lower clock frequency, e.g., reduced to a minimal clock speed (e.g., clock speed of between 0.9-1.1 GHz), or a clock speed between/intermediate to the minimal clock speed and the default clock speed. In an embodiment, as previously described, the respective CPUs in the first subset of CPUs and the second subset of CPUs can be based on a policy (e.g., policy 155A-n implemented by policy component 150) identifying which CPUs are to be throttled (e.g., in the second subset of CPUs) as a function of the operational demand placed on the system. As previously mentioned, the policy can be generated as a function of operational demand placed on the data server, with the policy configured to adjust the respective operational condition of a respective CPU in accordance with the operational demand placed on the data server.

At 320, the operational demand can be determined (e.g., by PCC 145, power monitoring component 147, and suchlike, monitoring demand data included in one or more operational status' 179A-n). In an embodiment, the operational demand can be assessed with reference to a threshold (e.g., one or more thresholds 157A-n generated/determined by threshold component 156). In an example scenario, a threshold (e.g., threshold 157A) can be established such that where the operational demand exceeds the threshold value, operational demand placed on the system is considered to be high and the respective CPUs in both the first subset of CPUs and the second subset of CPUs are to remain fully operational, e.g., at a maximum clocking speed, a default clocking speed, etc. In another example scenario, when operational demand is below the threshold value, while the first subset of CPUs remain fully operational, the second subset of CPUs can undergo throttling, e.g., reduce clocking speed to reduce operational energy demand.

At 330, in response to a determination (e.g., by PCC 145, power monitoring component 147, threshold component 156, and suchlike) that the operational demand equals or exceeds the threshold, methodology 300 can advance to 340, whereby the current operation of the system (e.g., data server 115) can be maintained at its current operation, e.g., both the first subset of CPUs and the second subset of CPUs can remain at a normal operation (e.g., a default clocking speed), whereupon methodology 300 can return to 310 for further monitoring of operational demand placed on the system.

At 330, in response to a determination that the operational demand is less than the threshold, methodology 300 can advance to 350, whereupon the operating condition (e.g., clocking speed) of the second subset of CPUs can be reduced while the operation condition of the first subset of CPUs remains at the normal/default level of operation. As previously mentioned, the operating condition of the second subset of CPUs can be adjusted (e.g., by the PCC 145), for example, by adjusting the BIOS (e.g., BIOS 111A-n) of the respective CPUs included in the second subset of CPUs. Methodology 300 can further advance to 360, whereupon the operational demand placed on the system can be subsequently assessed (e.g., at a second time T2, wherein T2 is subsequent to a first time T1 pertaining to steps 310-330).

At 370, a determination can be made (e.g., by PCC 145, power monitoring component 147, and suchlike) regarding whether the subsequent operational demand is less than, meets, or exceeds the threshold.

At 380, in response to a determination that YES, the subsequent operational demand is still below the threshold value, methodology 300 can advance to 390, whereupon the current operation of the respective CPUs in the first subset of CPUs and second subset of CPUs can be maintained. Methodology 300 can return to act 360, whereupon the operational demand on the system can be monitored further.

At 380, in response to a determination that NO, the subsequent operational demand is not below the threshold value, methodology 300 can advance to 395 whereupon the operating condition of the second subset of CPUs can be returned (e.g., via PCC 145 and BIOS 111A-n) to the default operating condition (or a condition between the minimal operating condition and the default operating condition). Methodology 300 can return to 310, whereupon the operational condition of the system can be further assessed and adjusted as needed.

Figure 4:
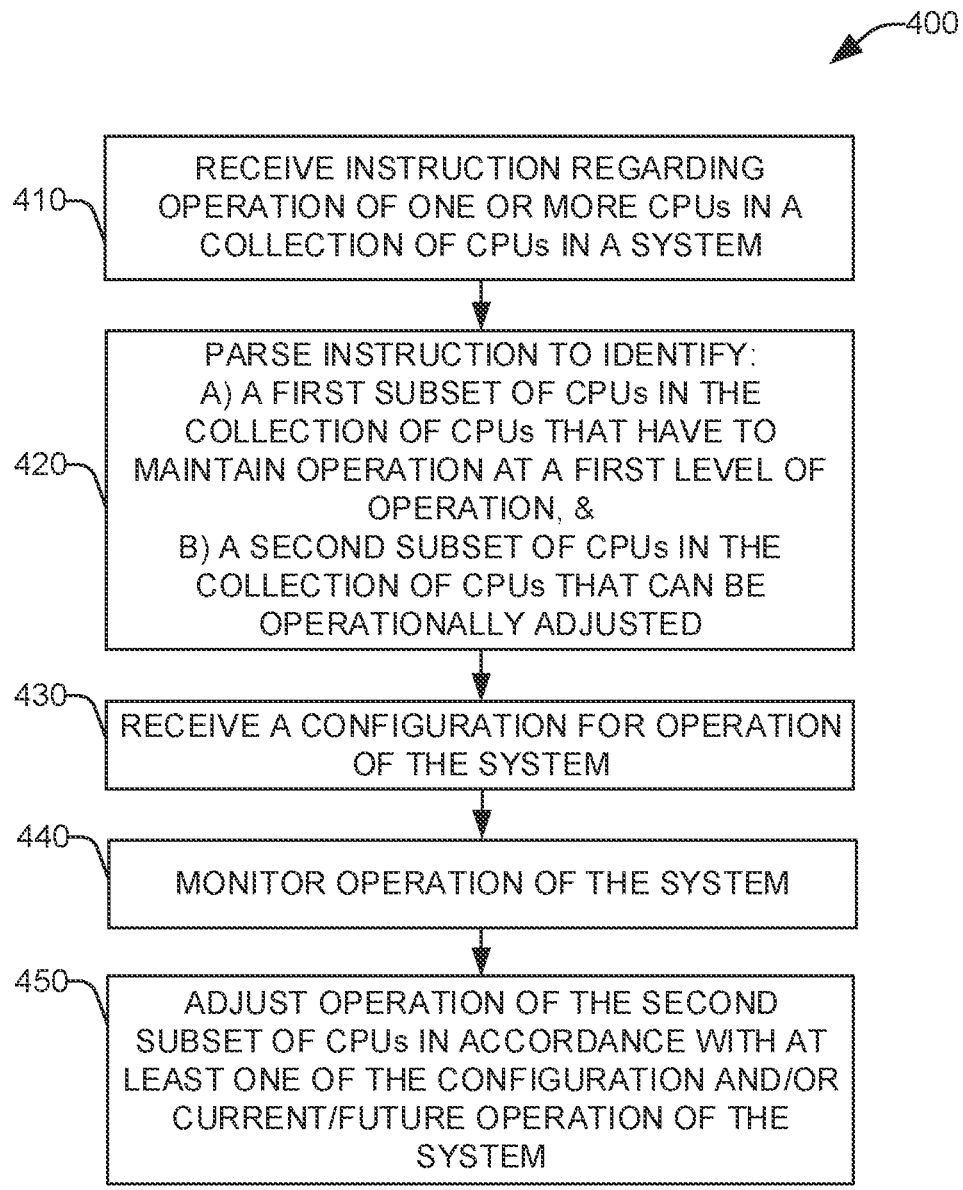
FIG. 4 presents a methodology illustrating a computer-implemented methodology for automatically controlling operation of one or more CPUs to minimize power requirements of a system, according to one or more embodiments.

FIG. 4, methodology 400, illustrates a computer-implemented methodology for automatically controlling operation of one or more CPUs to minimize power requirements of a system, according to one or more embodiments.

At 410, an instruction (e.g., instruction 162A-n) can be received (e.g., at PCS 140, PCC 145, policy component 150, and suchlike) indicating an operational condition for respective CPUs (e.g., CPUs 110A-n) in a system (e.g., data server 115). In an embodiment, the instruction can be received from an external source (e.g., from a human operator).

At 420, the instruction can be parsed/reviewed (e.g., by PCC 145, policy component 150, etc.) to identify the respective CPUs of concern and their operating condition. As previously mentioned, one or more CPUs in the system may be required to be available with a default operating condition (e.g., clocking speed is 2.0-2.8 GHz) implemented at all times, such that the one or more CPUs having the default operating condition to be implemented at all times can be combined (e.g., by PCC 145, policy component 150, etc.) into a first subset (e.g., subset 158A) of CPUs available at the system. As further previously mentioned, one or more CPUs in the system may be available to be operated with an operating condition between a minimal operation (e.g., clocking speed of 0.9-1.1 GHZ) and the default operating condition (e.g., clocking speed is 2.0-2.8 GHz), wherein the operating condition can be adjusted/throttled at any given time between the minimal operation, the default operation, and/or any operating condition therebetween. The one or more CPUs that can be throttled can be combined (e.g., by PCC 145, policy component 150, etc.) into a second subset (e.g., subset 158B) of CPUs available at the system.

At 430, a configuration (e.g., any of configurations 165A-n) can be received (e.g., by PCC 145), wherein the configuration can include one or more requirements regarding operation of the system. For example, as previously described, the configuration can include a requirement that the system be operated between 8 PM and 8 AM in a low power mode, such that while the first subset of CPUs is to operate with the default operation (e.g., default clocking speed of 2.0-2.8 GHz), operation of the second subset of CPUs can be reduced to the minimum operating condition (e.g., clocking speed is 0.9-1.1 GHz).

At 440, operation of the system can be monitored (e.g., by PCC 145, power monitoring component 147, etc.) such that when the requirement in the configuration is met (e.g., 8 PM occurs), operation of the system can be adjusted to comply with the requirement in the configuration.

At 450, e.g., at 8 PM, operation of the second subset of CPUs is adjusted (e.g., by PCC 145 and respective BIOS 111A-n), from a default clocking speed to a minimal clocking speed. As another requirement becomes relevant, e.g., system is operating at 8 AM, operation of the second subset of CPUs can be adjusted accordingly to comply with the requirement.

Figure 5:
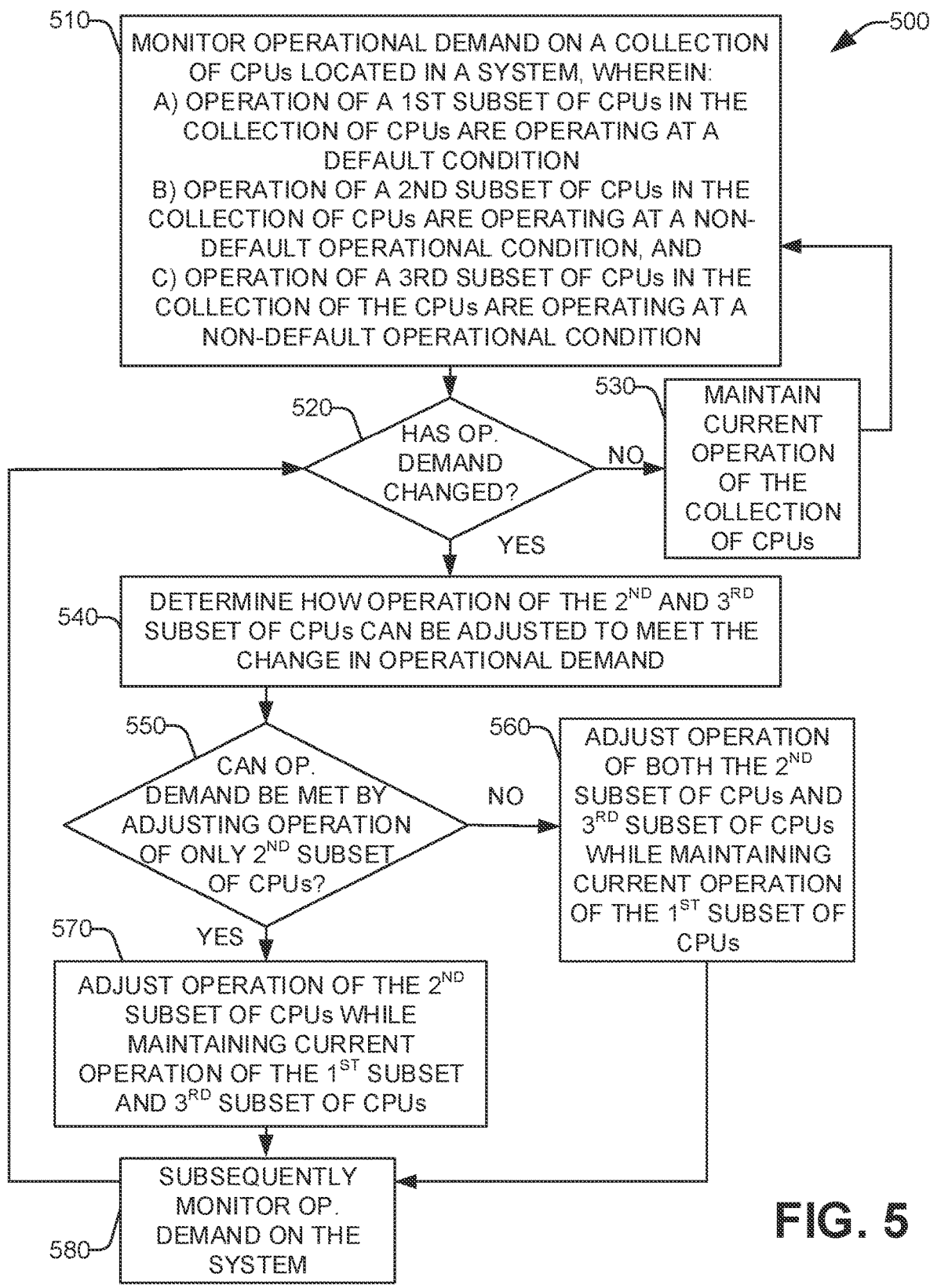
FIG. 5 presents a methodology illustrating a computer-implemented methodology for automatically controlling operation of one or more CPUs to minimize power requirements of a system, according to one or more embodiments.

FIG. 5, methodology 500, illustrates a computer-implemented methodology for automatically controlling operation of one or more CPUs to minimize power requirements of a system, according to one or more embodiments.

At 510, operational demand placed on a system (e.g., data server 115) can be monitored (e.g., by PCC 145, power monitoring component 147, etc.), and based thereon, operation of one or more CPUs (e.g., CPUs 110A-n) can be adjusted according to a configuration (e.g., configuration(s) 165A-n), an instruction (e.g., instruction(s) 162A-n), a policy (e.g., policy 155A-n), a threshold (e.g., threshold(s) 157A-n), and suchlike. Any combination of operation of the CPUs can be utilized, for example, a first subset (e.g., subset/group 158A) of the CPUs are to remain at a default operating condition (e.g., with a clocking speed of 2.0-2.8 GHz), while a second subset (e.g., subset/group 158B) of the CPUs can be throttled (e.g., with a clocking speed anywhere at and/or between a minimal clocking speed of 0.9-1.0 GHz through to the default clocking speed of 2.0-2.8 GHz), while a third subset (e.g., subset 158C) of CPUs can also be throttled between the minimal and default clocking speed. While only three subsets are identified in FIG. 5, any number of subsets of CPUs can be created, e.g., from a $1^{st}$ subset through to an $n^{th}$ subset, (e.g., in accordance with an instruction 162A-n).

At 520, a determination can be made (e.g., by PCC 145, power monitoring component 147, etc.) as to whether operational demand of the system has changed/is due to change. In an example scenario, the change in operational demand can be based on a configuration (e.g., configuration 165A-n), such as power consumption of the system can be reduced between 8 PM and 8 AM. In another example scenario, the change in operational demand can be simply a function of greater or lesser demand is currently being placed on the system, e.g., the operational demand reflects real-time operation of the system and the volume of workloads present at any given moment. The real-time operation can be determined by a power monitoring component (e.g., power monitoring component 147) detecting respective operation of the CPUs per an operational status (e.g., status' 179A-n), such that as operational demand increases or decreases, the second subset CPUs and third subset CPUs can be throttled (e.g., by PCC 145 and BIOS 111A-n) in accordance with the determined demand.

At 520, in response to a determination that NO, the operation demand has not changed (e.g., no new requirement in a configuration 165A-n is to be implemented, no change in the status' 179A-n has been identified), methodology 500 can advance to 530, whereupon the current operating condition/status of the respective CPUs can be maintained. Methodology 500 can return to 510 for further monitoring of the operational demand placed on the system.

At 520, in response to a determination that YES, there has been a change in operational demand (e.g., a new requirement in a configuration 165A-n is to be met, real-time operation of the system is changing, and suchlike), methodology 500 can advance to 540, whereupon an operational change in one or more of the CPUs in the second subset and the third subset of CPUs can be implemented to meet the change in operational demand.

Advancing to 550, a determination can be made (e.g., by PCC 145) whether the demand can be met by adjusting operation of only the second subset of CPUs. In response to NO, the demand cannot be met solely by adjusting operation of the second subset of CPUs (e.g., where demand involves reducing electric consumption of the system, where demand is an increase in processing requirement as a function of increased workloads to be processed, and suchlike), methodology 500 can advance to 560, whereupon operation of both the second subset of CPUs and the third subset of CPUs can be adjusted (e.g., by PCC 145 and BIOS 111A-n) to meet the demand, while the first subset of CPUs are maintained at the default operation. For example, depending upon the demand, the second subset and third subset of CPUs can be reduced to a minimal operating condition, can be increased to the default operating condition, or an intermediate operating condition. Methodology 500 can further advance to 570, whereupon the operational demand(s) of the system can be subsequently monitored, with methodology returning to 520 for further determination on how to respond to a change in operational demand.

At 550, in response to a determination that YES, the change in operation can be met by adjusting operation (e.g., by PCC 145 and BIOS 111A-n) of the second subset of CPUs while maintaining current operation of the first subset of CPUs and the third subset of CPUs. Methodology 500 can further advance to 570 for subsequent monitoring of demand on the system, as previously mentioned.

Figure 6:
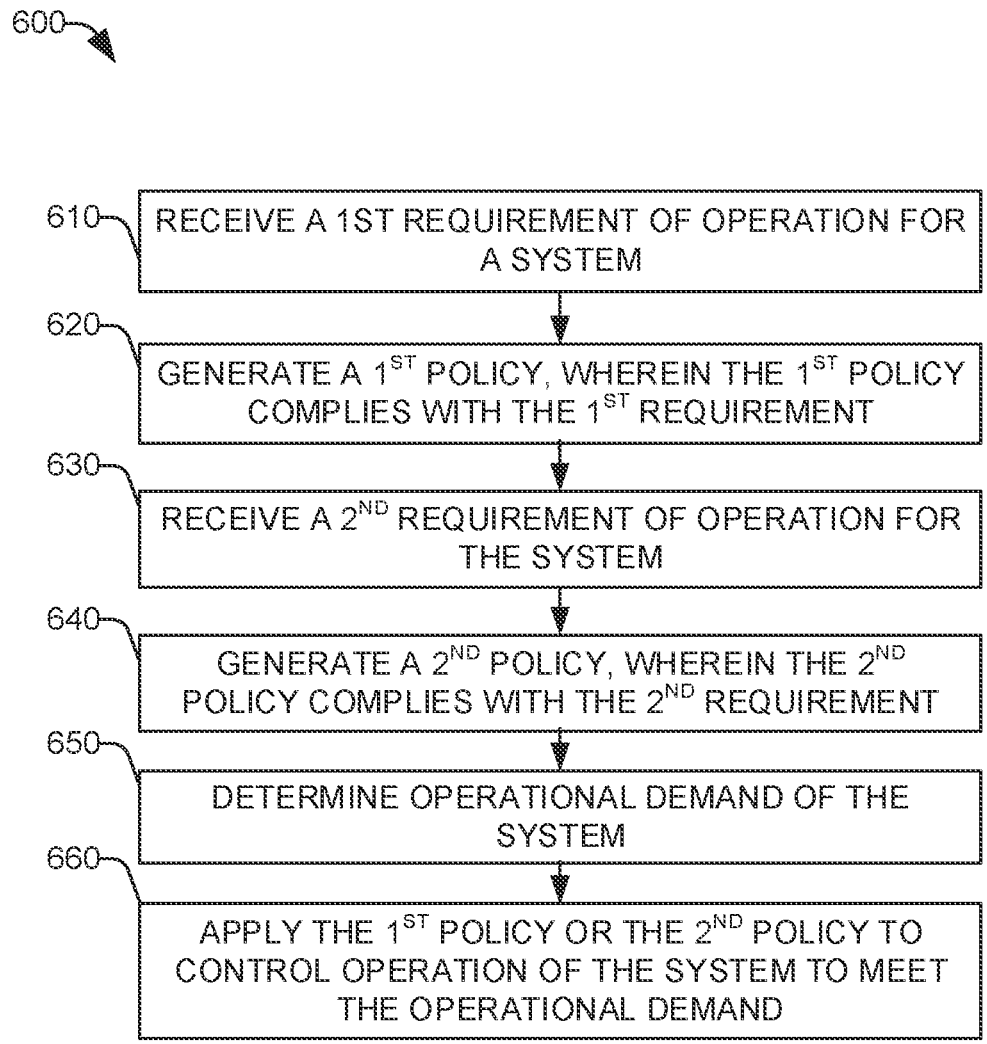
FIG. 6 presents a methodology illustrating a computer-implemented methodology for automatically controlling operation of one or more CPUs to minimize power requirements of a system, according to one or more embodiments.

FIG. 6, methodology 600, illustrates a computer-implemented methodology for automatically controlling operation of one or more CPUs to minimize power requirements of a system, according to one or more embodiments.

At 610, a configuration (e.g., configuration 165A-n) can be received (e.g., by PCC 145), wherein the configuration can include a first requirement of operation for a system (e.g., a data server 115). As previously mentioned, the configuration can pertain to operational requirements/concerns such as environmental, system, user, input/output (I/O) requirements, etc. The requirement can be parsed (e.g., by PCC 145) to determine how the requirement can be complied with by the system. For example, one or more AI processes (e.g., processes 170A-n) can be applied to the requirement to determine a number (e.g., subset) of CPUs that can be utilized to meet the requirement and further, operational condition of the CPUs, e.g., default operating condition, minimal operating condition, etc. In another example, a threshold (e.g., threshold 157A-n) of operational demand can be generated (e.g., by PCC 145, policy component 150, processes 170A-n, and suchlike) such that when the threshold is met, operation of the respective CPUs can be adjusted (e.g., by PCC 145) to meet the respective requirement.

At 620, based on the respective number of CPUs, threshold(s), etc., one or more policies (e.g., policies 155A-n) can be generated (e.g., by PCC 145, policy component 150, etc.) that capture how the respective CPUs are to respond to the determined change in operational demand. Hence, a first policy can be generated in accordance with a first requirement in a configuration, wherein, in an embodiment, the first policy can be assigned to a first subset of CPUs.

At 630, a second requirement can be received in a configuration regarding operation of the system.

At 640, a second policy can be generated, as previously described, in accordance with the second requirement. In an embodiment, the second policy can be directed towards a second subset of CPUs.

At 650, operational demand can be determined for the system, wherein the demand can be determined in real time (e.g., by PCC 145, power monitoring component 147, status' 179A-n, and suchlike).

At 660, based upon the determined operational demand (e.g., based on a requirement, based on a current operating condition, etc.) the first policy (e.g., the operational conditions trigger a threshold 157A pertaining to implementing the first policy) can be applied to the system and/or the second policy (e.g., the operational conditions trigger a threshold 157B pertaining to implementing the second policy) can be applied to the system. As previously mentioned, the first policy and the second policy can be respectively directed towards operation of one or more subsets (e.g., subsets 158A-n) of CPUs included in the system.

Figure 7:
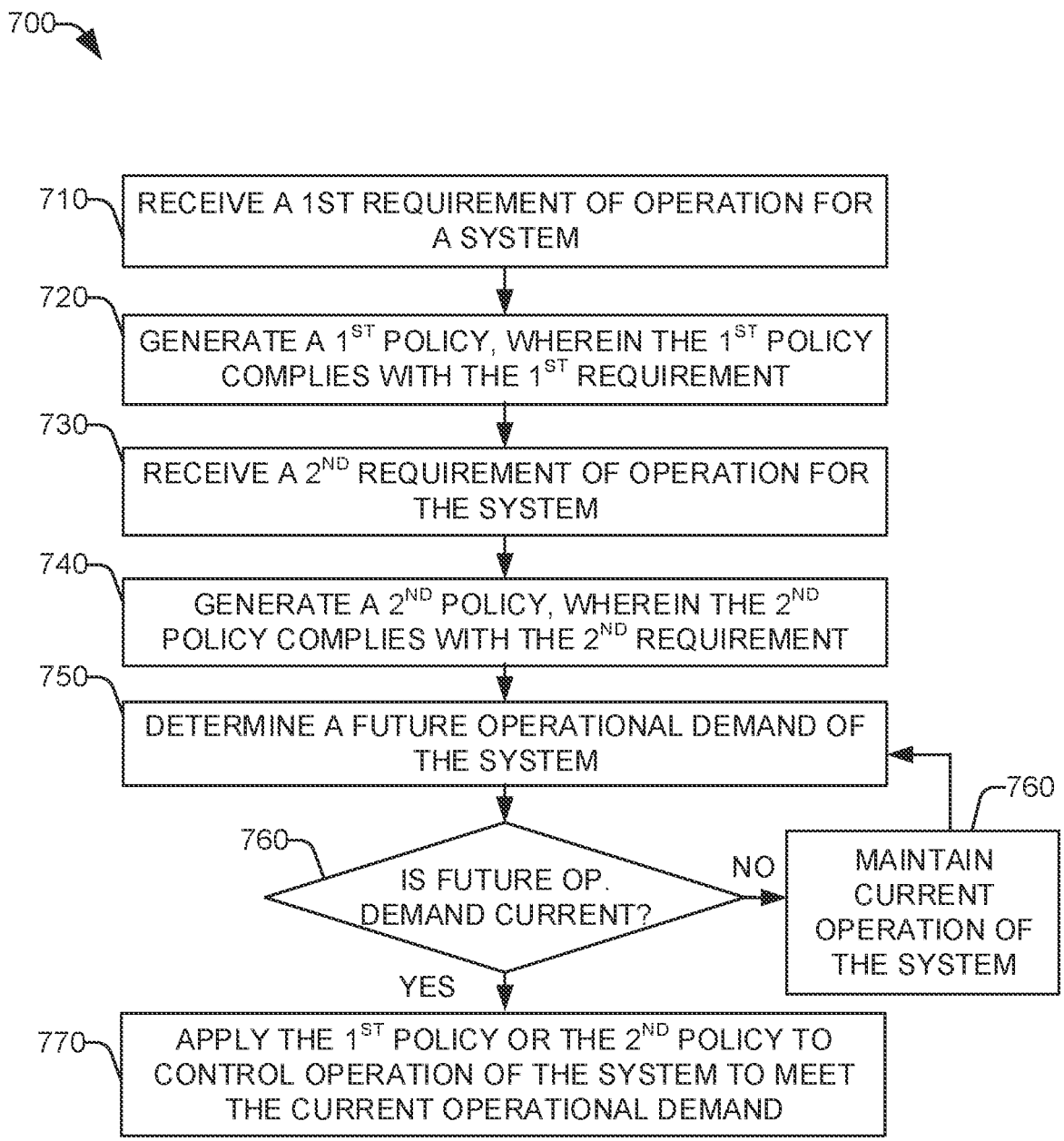
FIG. 7 presents a methodology illustrating a computer-implemented methodology for automatically controlling operation of one or more CPUs to minimize power requirements of a system, according to one or more embodiments.

FIG. 7, methodology 700, illustrates a computer-implemented methodology for automatically controlling operation of one or more CPUs to minimize power requirements of a system, according to one or more embodiments.

At 710, a configuration (e.g., configuration 165A-n) can be received (e.g., by PCC 145), wherein the configuration can include a first requirement of operation for a system (e.g., a data server 115). As previously mentioned, the configuration can pertain to operational requirements/concerns such as environmental, system, user, input/output (I/O) requirements, etc. The requirement can be parsed (e.g., by PCC 145) to determine how the requirement can be complied with by the system. For example, one or more AI processes (e.g., processes 170A-n) can be applied to the requirement to determine a number (e.g., subset) of CPUs that can be utilized to meet the requirement and further, operational condition of the CPUs, e.g., default operating condition, minimal operating condition, etc. In another example, a threshold (e.g., threshold 157A-n) of operational demand can be generated (e.g., by PCC 145, policy component 150, processes 170A-n, and suchlike) such that when the threshold is met, operation of the respective CPUs can be adjusted (e.g., by PCC 145) to meet the respective requirement.

At 720, based on the respective number of CPUs, threshold(s), etc., one or more policies (e.g., policies 155A-n) can be generated (e.g., by PCC 145, policy component 150, etc.) that capture how the respective CPUs are to respond to the determined change in operational demand. Hence, a first policy can be generated in accordance with a first requirement in a configuration, wherein, in an embodiment, the first policy can be assigned to a first subset of CPUs.

At 730, a second requirement can be received in a configuration regarding operation of the system.

At 740, a second policy can be generated, as previously described, in accordance with the second requirement. In an embodiment, the second policy can be directed towards a second subset of CPUs.

At 750, a future operational demand can be determined for the system, wherein the demand can be a demand outlined in a configuration (e.g., at 8 PM reduce energy demand of the system, when demand is reducing consecutively over a period of time, and suchlike).

At 760, a determination can be made (e.g., by PCC 145, power monitoring component 147, and suchlike) regarding whether the future operational demand is now occurring, e.g., the time of operation is now 8 PM, an operational demand (e.g., a threshold 157A-n has been reached, and suchlike). At 770, in response to a determination that NO, the future operational demand has yet to occur, methodology 700 can advance to 770, whereupon current operation of the system (e.g., current operational settings of the respective subsets of CPUs) are maintained, with methodology 700 returning to 750 for further operational demand of the system to be determined and complied with.

At 760, in response to a determination that the future operational demand is occurring (e.g., time of system operation is 8 PM, operational demand on the system has reduced/ increased over a given period of time, and suchlike), the respective first policy or second policy can be implemented in accordance with the conditions of the operational demand.

Figure 8:
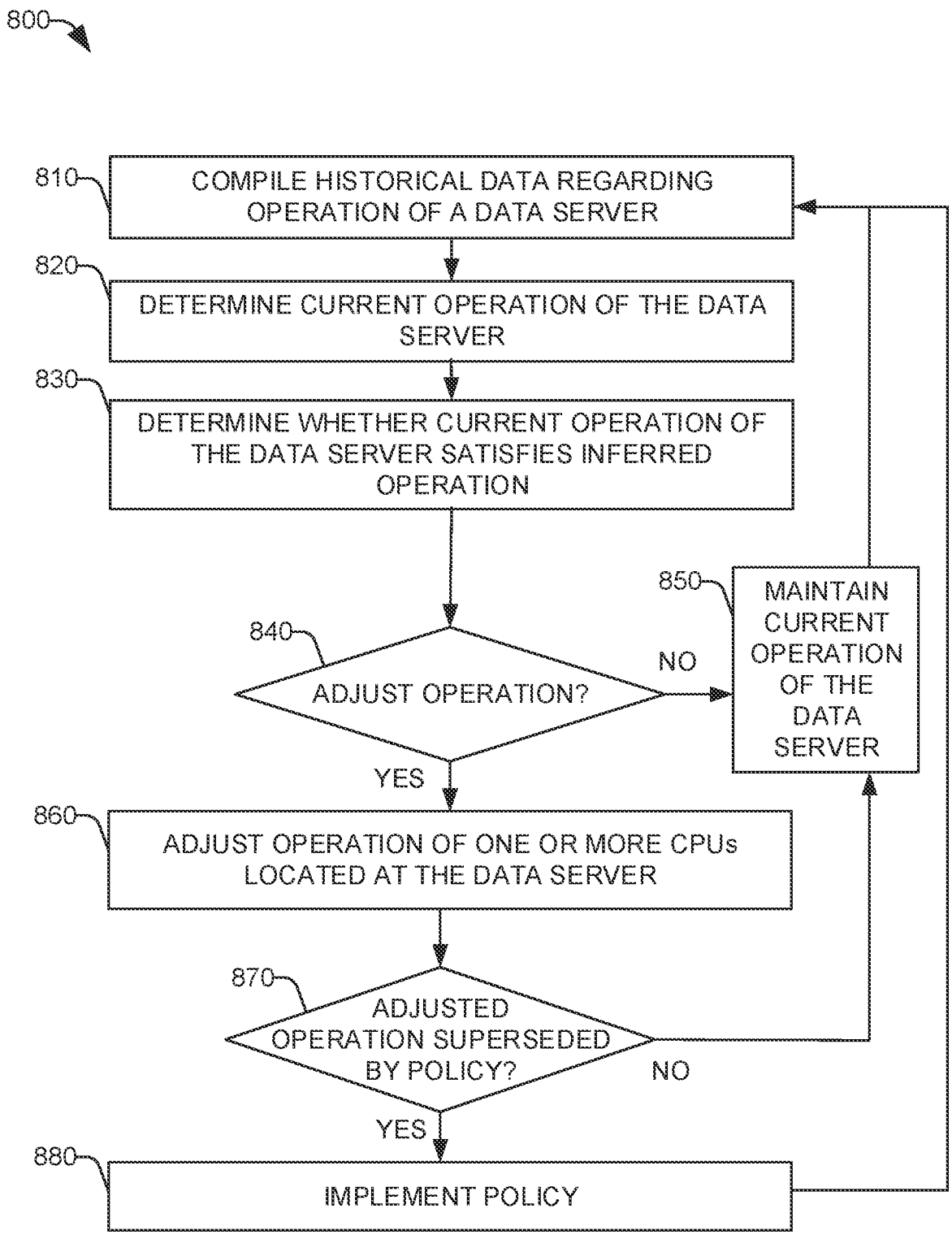
FIG. 8 presents a methodology illustrating a computer-implemented methodology for automatically controlling operation of one or more CPUs to minimize power requirements of a system, according to one or more embodiments.

FIG. 8, methodology 800, illustrates a computer-implemented methodology for automatically controlling operation of one or more CPUs to minimize power requirements of a system, according to one or more embodiments.

At 810, as previously mentioned, operational history of the system (e.g., data server 115) can be monitored (e.g., by power monitoring component 147) and operational data (e.g., status' 179A-n) compiled regarding respective operation of CPUs (e.g., CPUs 110A-n) and operational demand placed on the system. The operational data can be stored (e.g., in memory 184 as historical status' 167A-n).

At 820, a current operation of the system can be obtained (e.g., status 179P of operational of a CPU 110P captured by power monitoring component 147).

At 830, a future operation of the system can be inferred (e.g., by historian component 166) based on, for example, reviewing the operational history (e.g., in historical status' 167A-n) in conjunction with the current operational status of the one or more CPUs in the system (e.g., as captured in the in the current status 179A-n). The review can identify whether the current/future operational demand can be met by the current operational configuration of the respective CPUs or whether one or more of the CPUs should be adjusted regarding operational performance (e.g., increase/ reduce clocking speed).

At 840, a determination can be made as to whether the operational performance of one or more CPUs should be adjusted to meet the inferred operational demand being/to be placed on the system. In response to a determination that NO, operation of one or more CPUs is not required to be adjusted, methodology 800 can advance to 850, whereupon current operational performance of the one or more CPUs in the system is maintained, with methodology 800 returning to 810 for further monitoring of operation of the system.

At 840, in response to a determination that YES, current operation of one or more of the CPUs will not be able to meet the operational demand inferred to be placed on the system, methodology 800 can advance to 860, whereupon operation of one or more of the CPUs is to be adjusted. In an embodiment, the historian component can generate and transmit an instruction to a power control component (e.g., PCC 145) to adjust operation of the one or more CPUs, whereupon the power control component can adjust operation of the one or more CPUs via a BIOS (e.g., BIOS 111A-n) associated with the respective CPU to be operationally adjusted.

At 870, at a subsequent moment in time, a determination can be made (e.g., by PCC 145, policy component 150) as to whether the adjusted operation of the CPUs has been superseded by a policy (e.g., policy 155A-n) that is being/ due to be implemented. In response to a determination that, NO, the current operation of the CPUs does not require adjustment in view of the policy, methodology 800 can advance to 850 for operation of the system to be maintained, with methodology 800 further returning to 810 for further review of operation of the system to be performed.

At 870, in response to a determination that YES, the adjusted operation of the CPUs is to be superseded by the policy configuration, methodology 800 can advance to 880, whereupon the policy is implemented with corresponding operational adjustment of the CPUs. Methodology 800 can subsequently return to 810 for further review of operation of the system to be performed.

Figure 9:
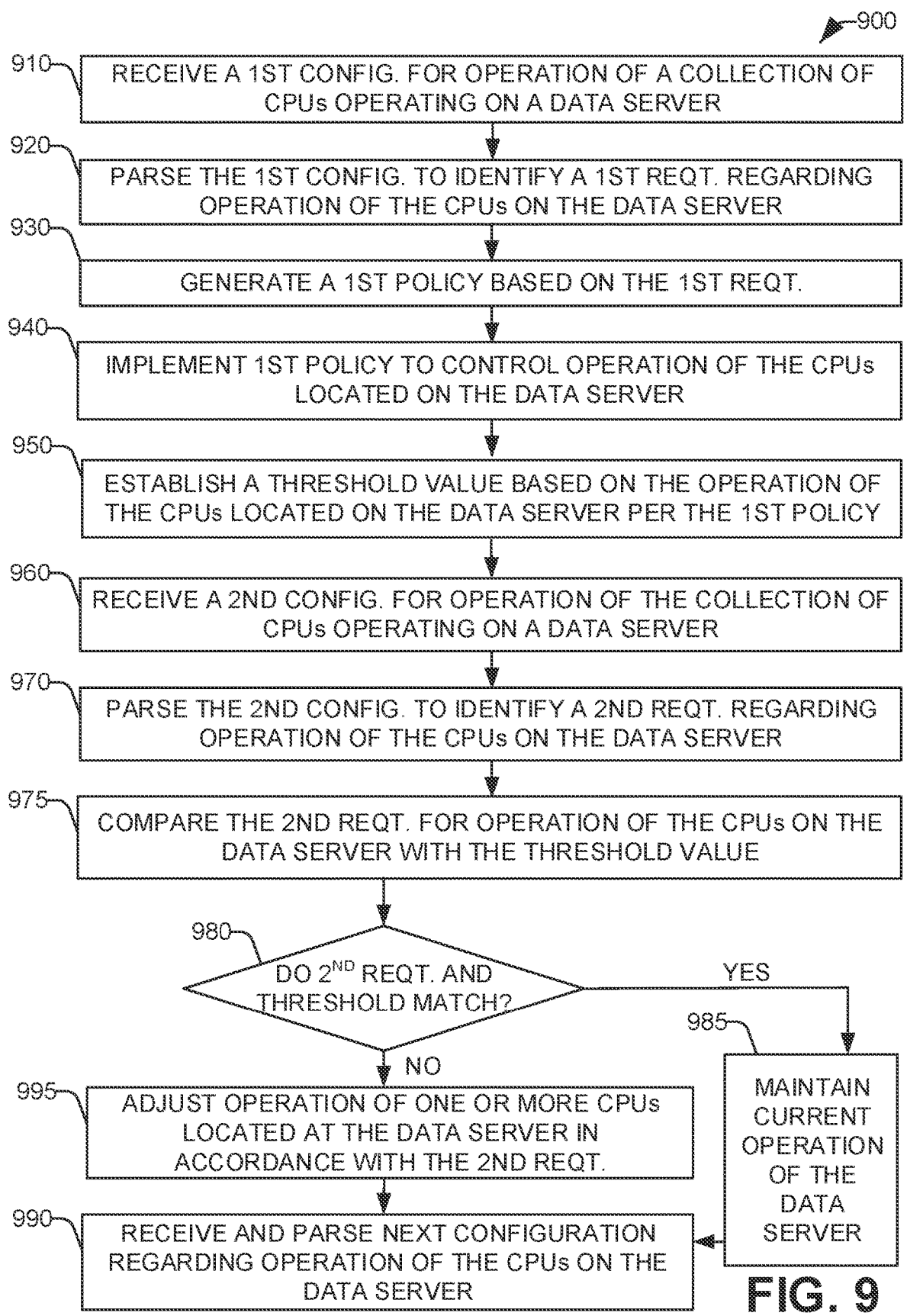
FIG. 9 presents a methodology illustrating a computer-implemented methodology for automatically controlling operation of one or more CPUs to minimize power requirements of a system, according to one or more embodiments

FIG. 9, methodology 900, illustrates a computer-implemented methodology for automatically controlling operation of one or more CPUs to minimize power requirements of a system, according to one or more embodiments.

At 910, a first configuration (e.g., configuration 165A) can be received at a power control system (e.g., PCS 140 via the configuration component 160). As previously mentioned, the first configuration can relate to operation of a collection of CPUs (e.g., CPUs 110A-n) located on/operating on a data server (e.g., data server 115).

At 920, the first configuration can be parsed (e.g., by the configuration component 160, policy component 150, PCC 145, etc.) to identify a first requirement of operation of the collection of CPUs in the first configuration.

At 930, a first policy (e.g., policy 155A) can be generated by a policy component (e.g., policy component 150) based on the first requirement identified in the first configuration. As previously described, the first policy can be generated by the policy component regarding operating conditions to be respectively applied to respective CPUs in the collection of CPUs. The first policy can indicate which CPUs are to operate with a particular clocking speed, e.g., a first subset (e.g., subset 158A) of CPUs are assigned by the policy component to operate with a first clocking speed (e.g., a default clocking speed), while a second subset of CPUs are assigned by the policy component to operate with a second clocking speed. As previously mentioned, the one or more requirements/configurations can function as operational demand data defining how the respective CPUs are to operate at the data server. As previously mentioned, the respective subsets of CPUs can be identified based on an instruction (e.g., instruction 162A) received at the power controller system. As further previously mentioned, more than one policy can be generated by the policy component in response to the requirement/configuration.

At 940, the first policy can be implemented by the power control component (PCC 145), wherein the power control component can apply the respective settings (e.g., clocking speeds) to the respective CPUs in the collection of CPUs at the data server.

At 950, a threshold (e.g., threshold 157A) can be generated by a threshold component (e.g., threshold component 156), whereby the threshold is based on the respective settings applied to the respective CPUs in the collection of CPUs at the data server. For example, the policy component can be configured to total the combined settings respectively assigned to the CPUs to identify a level of operation of the CPUs/data server. For example, in a scenario where all of the CPUs are operating at the default clock speed, the threshold value can be 100%. In another example, where 50% of the CPUs are operating at the default clock speed and the remaining 50% of the CPUs are operating at the minimal clock speed, the threshold value can be 50% (e.g., where default operation is designated as 100% operation, and minimal operation is designated as 0% operation). In another example, where 50% of the CPUs are operating at the default clock speed (e.g., 2.4 GHZ) and the remaining 50% of the CPUs are operating at an intermediate clock speed (e.g., 1.7 GHZ, where minimal clock speed is 1.0 GHZ), the threshold value can be 75% (e.g., where default operation is designated as 100% operation, and intermediate operation is designated as 50% operation). It is to be appreciated that the threshold values presented are arbitrary and any suitable values can be utilized to express operating conditions/settings of the CPUs as a threshold/numerical value.

At 960, a second configuration (e.g., configuration 165B) can be received, wherein the second configuration is to be implemented to control operation of the CPUs in the collection of the CPUs.

At 970, the second configuration can be parsed (e.g., by the configuration component 160, policy component 150, PCC 145, etc.) to identify a second requirement of operation of the collection of CPUs in the second configuration. In a similar manner to how the threshold values were generated (per act 950), the respective operation settings for the respective CPUs can be expressed as a numerical value (e.g., by the threshold component 156 and/or by the policy component 150), e.g., a second threshold value (e.g., threshold value 157B) is generated.

At 975, the threshold component (e.g., threshold component 156) can be configured to compare the first threshold value (e.g., threshold value 157A) with the second threshold value (e.g., threshold value 157B).

At 980, in response to a determination that YES, the first threshold value and the second threshold value match/are equivalent, methodology 900 can advance to 985, whereupon current operation, and operational settings, of the CPUs is maintained, whereupon, methodology 900 can advance to 990 for the next configuration to be received, parsed, and determined threshold value compared with the current operation of the CPUs.

At 980, in response to a determination that NO, the first threshold value and the second threshold value do not match/are not equivalent, methodology 900 can advance to 995, whereupon current operation, and operational settings, of the CPUs is adjusted (e.g., by PCC 145 and BIOS' 111A-n, as previously described) to satisfy the second configuration. For example, where the first threshold value exceeds/is greater than the second threshold value, the clocking speed(s) of one or more CPUs can be slowed down to satisfy the operational demand of the second configuration. In another example, where the first threshold value is less than the second threshold value, the clocking speed(s) of one or more CPUs can be increased to satisfy the operational demand of the second configuration. Upon implementation of the second configuration and operational adjustment of the one or more CPUs, methodology 900 can advance to 990 for the next configuration to be received, parsed, and determined threshold value compared with the current operation of the CPUs, wherein methodology 900 can return to step 910 with the second configuration now functioning as the first configuration and the next received configuration (e.g., a third configuration) now functioning as the second configuration in methodology 900.

Per the various embodiments presented herein, various components included in the PCS 140, e.g., PCC 145, historian component 166, power monitoring component 147, policy component 150, threshold component 156, processes 170A-n, configuration component 160, and suchlike, can include AI and ML reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, a process (e.g., by historian component 166) for determining whether to adjust operation of one or more CPUs 110A-n can be utilized, and further, configuring the respective CPUs 110A-n, and suchlike, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., avoidance of an accident, and operations related thereto).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier (s) can be used to automatically learn and perform a number of functions, including but not limited to determining according to predetermined criteria, probability of an accident in conjunction with avoidance of an accident, for example.

As described supra, inferences can be made, and operations performed, based on numerous pieces of information. For example, whether status' 179A-n and historical status' 167A-n indicate operation of the CPUs 110A-n is to be adjusted, whether a policy 155A-n is being complied with, whether operation of respective CPUs 110A-n should be adjusted to meet a policy 155A-n, and if so, how many CPUs 110A-n to adjust and the operational condition at which they should be placed, and suchlike, to enable a reduction in energy consumption of the data server 115.

Example Environments of Use

Figure 10:
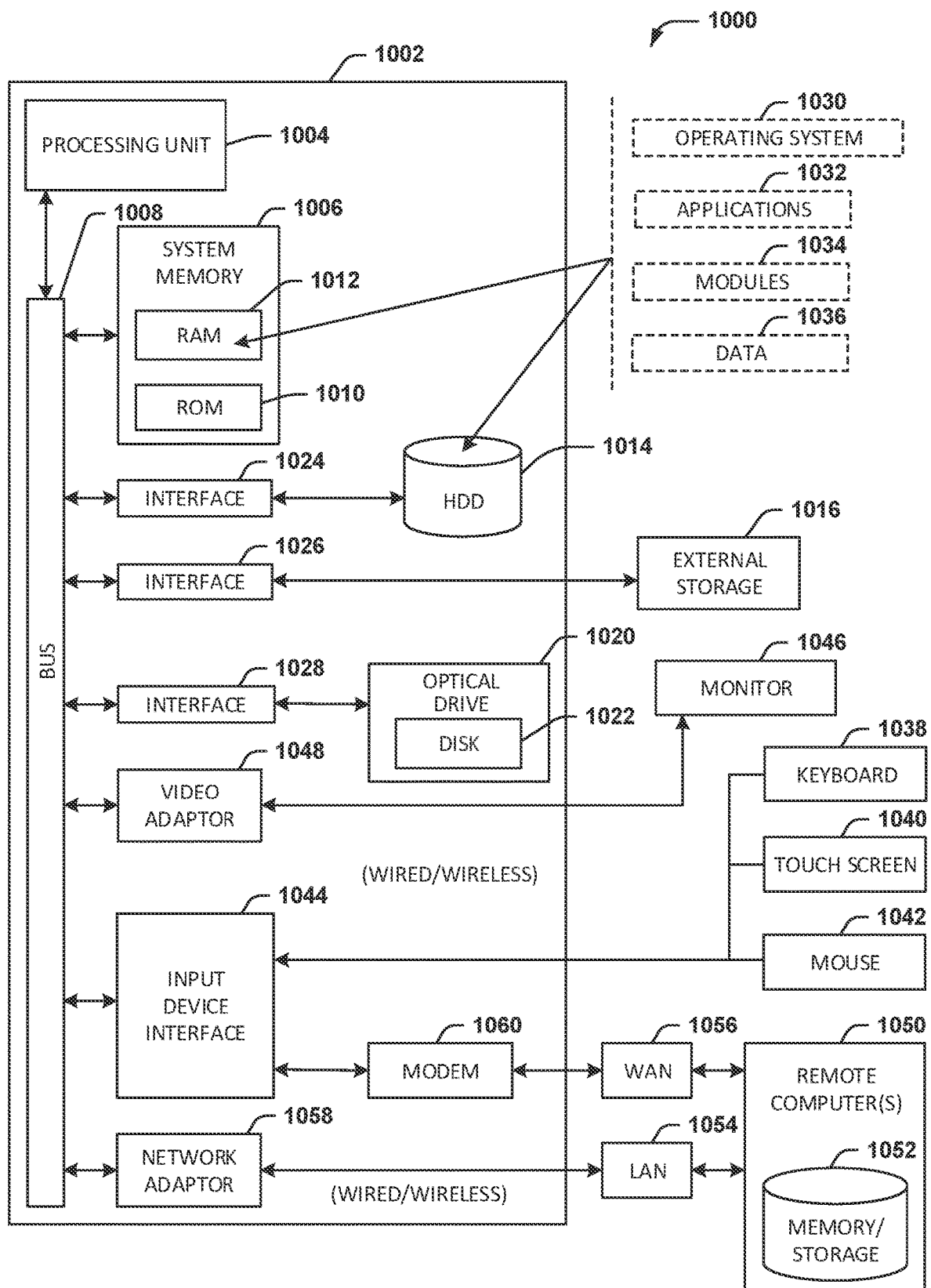
FIG. 10 depicts an example schematic block diagram of a computing environment with which the disclosed subject matter can interact/be implemented at least in part, in accordance with various aspects and implementations of the subject disclosure.
Figure 11:
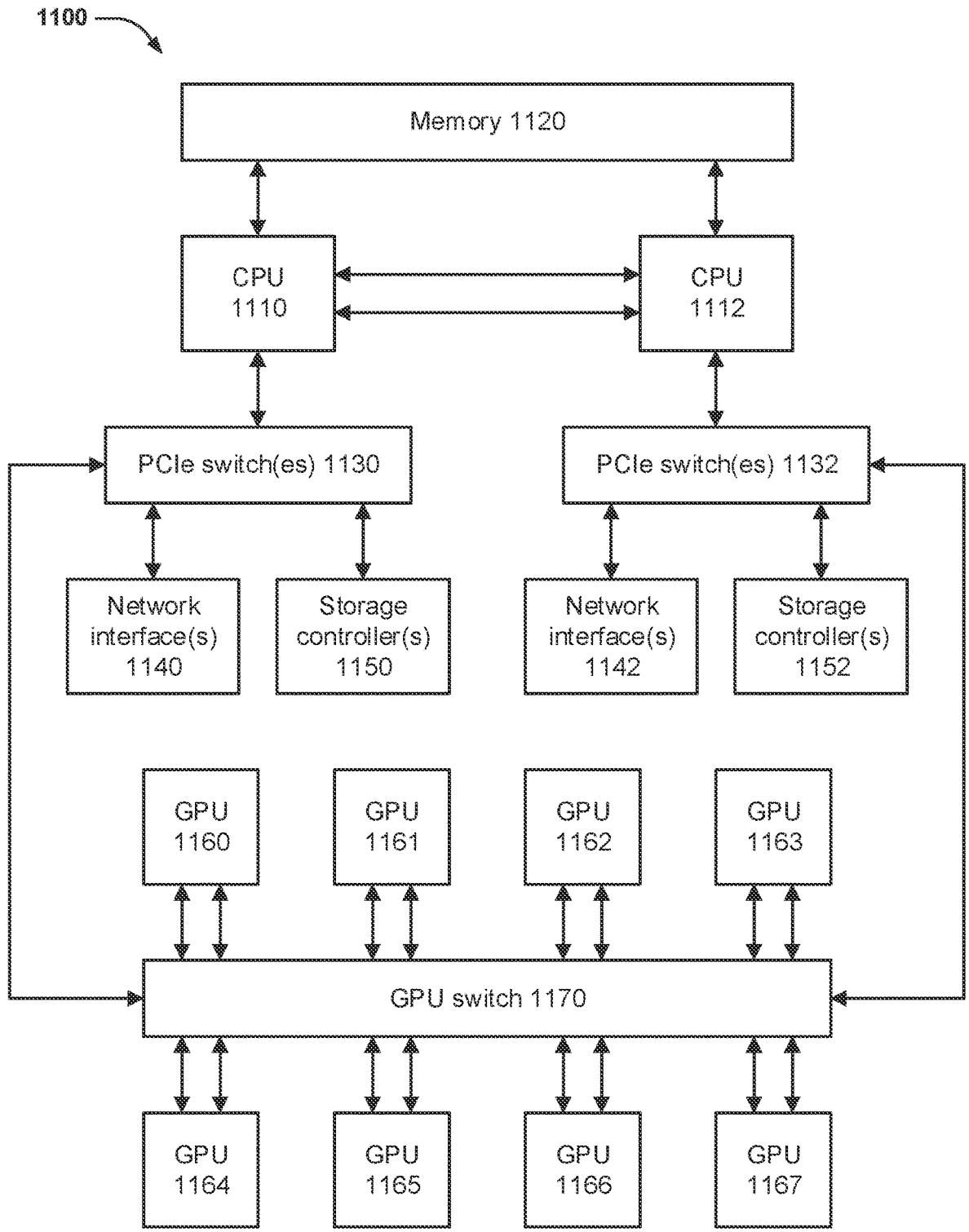
FIG. 11 is a diagram of an example computing environment in which various implementations described herein can function.
Figure 12:
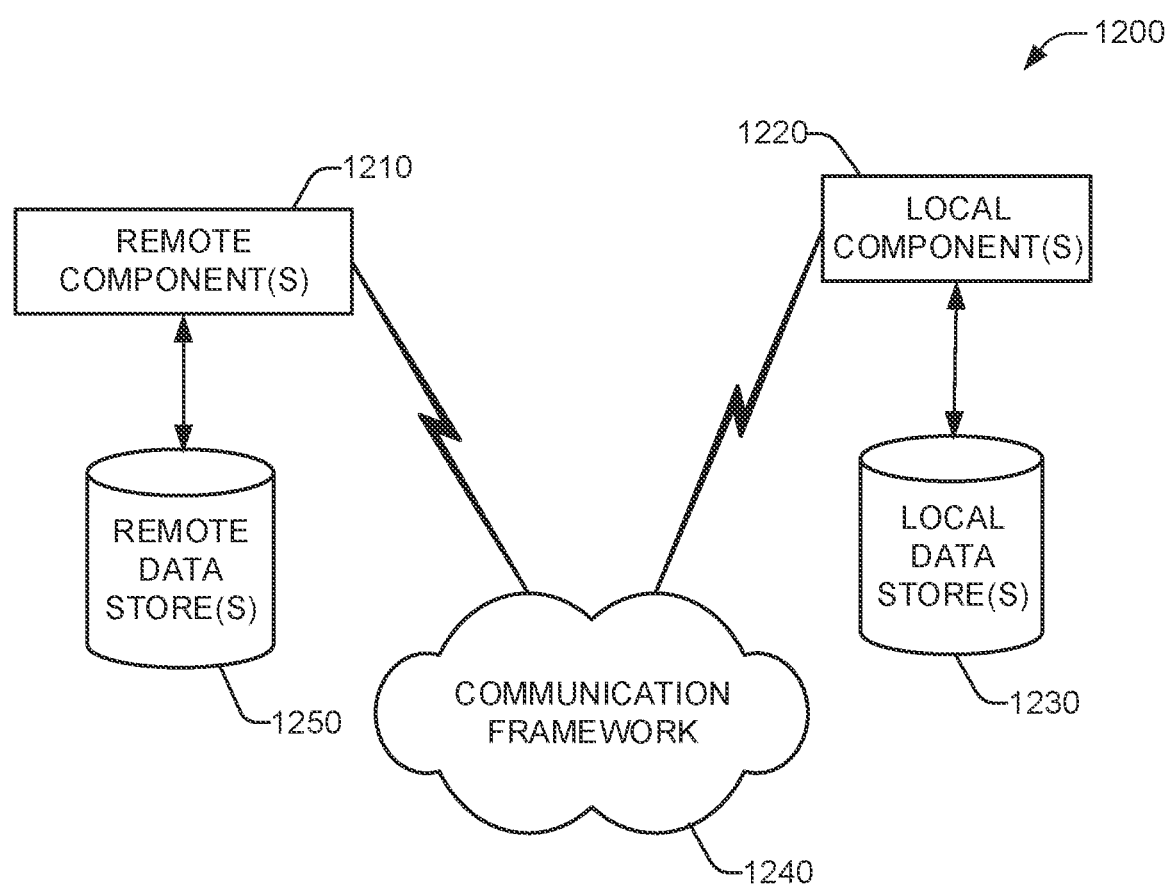
FIG. 12 is a block diagram representing an example computing environment into which aspects of the subject matter described herein may be incorporated.

Turning next to FIGS. 10-12, a detailed description is provided of additional context for the one or more embodiments described herein with FIGS. 1A-9.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1084 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning next to FIG. 11, an example server architecture 1100 that can be utilized in connection with one or more implementations described above is illustrated. The server architecture 1100 shown in FIG. 11 can be associated with a server device, such as a rackmount server, a blade server, or the like, which can be physically and/or communicatively coupled to a chassis (not shown in FIG. 11) and/or other physical devices for use in a computing environment such as a computing cloud, a data center, etc.

The server architecture 1100 shown in FIG. 11, referred to below as simply a server for brevity, can include one or more central processing units (CPUs), here two CPUs 1110, 1112. In a typical implementation of the server 1100, the CPUs 1110, 1112 are high-performance server processors that provide scalability and a high number of processing cores per CPU, e.g., up to 56 cores per processor for current implementations. The CPUs 1110, 1112 of the server 1100 are communicatively coupled to each other by, e.g., processor interconnect links, such as QuickPath Interconnect (QPI) or Ultra Path Interconnect (UPI) links developed by the Intel® Corporation. Alternatively, other means for coupling the CPUs 1110, 1112, such as a front side bus (FSB) or the like, could also be used. While two interconnect links are shown in FIG. 11 coupling CPUs 1110 and 1112, it is noted that more, or fewer, links could also be used.

The CPUs 1110, 1112 shown in FIG. 11 are additionally coupled to a system memory 1120, which can include one or more Dual In-line Memory Modules (DIMMs) and/or other devices. While the system memory 1120 is illustrated as a single block in FIG. 11 for simplicity, it is noted that the system memory 1120 is typically implemented via a group of memory modules. For example, the CPUs 1110, 1112 can collectively be associated with a number of DIMM slots (e.g., 16 slots, 32 slots, etc.), and DIMMs making up the system memory 1120 can be placed into these slots to facilitate connection to the CPUs 1110, 1112. Depending on implementation, the memory modules making up the system memory 1120 can be communicatively coupled to one, or more, of the CPUs 1110, 1112.

As further shown in FIG. 11, Peripheral Component Interconnect Express (PCIe) switches 1130, 1132 can connect the CPUs 1110, 1112 to respective other components of the server 1100, such as network interfaces 1140, 1142, storage controllers 1150, 1152, or the like. The network interfaces 1140, 1142 can include network interface cards (NICs) and/or other suitable components to facilitate connecting the server 1100 to other servers or suitable computing devices, e.g., in a clustered computing environment. The storage controllers 1150, 1152 can include nonvolatile memory express (NVMe) controllers and/or other interface devices that facilitate the coupling of storage devices, such as non-volatile RAM (NVRAM) devices, SSDs, or the like, to the server 1100.

While FIG. 11 shows a configuration in which each CPU 1110, 1112 is connected to one PCIe switch 1130, 1132, other configurations could be used. For instance, a one-to-many or many-to-one connection scheme could be used between the CPUs 1110, 1112 and the PCIe switches 1130, 1132. Similarly, the network interfaces 1140, 1142 and storage controllers 1150, 1152 could be connected to the PCIe switches 1130, 1132 in a one-to-many or many-to-one configuration in addition to, or in place of, the one-to-one connection scheme shown in FIG. 11.

The server 1100 shown in FIG. 11 further includes a group of co-processors, such as graphics processing units (GPUs), intelligence processing units (IPUs) for artificial intelligence workloads, etc.; in FIG. 11, there are eight GPUs 1160-1167, which provide further processing capability to server 1100. While eight GPUs 1160-1167 are shown in FIG. 11, more, or fewer, GPUs could also be used. The GPUs 1160-1167 of server 1100 are preferably specialized GPUs that are designed for high-performance computing applications, such as H100 and/or A100 GPUs developed by the NVIDIA® Corporation, although other GPUs could also be used. Each of the GPUs 1160-1167 of the server are communicatively coupled to each other via suitable communications links, such as NVLink® interconnects developed by the NVIDIA® Corporation and/or other suitable connections. In the example shown by FIG. 11, a GPU switch 1170 facilitates full interconnection between the GPUs 1160-1167. In other implementations, the GPUs 1160-1167 could instead be interconnected directly without the use of a switch or other means.

As additionally shown by FIG. 11, the GPU switch 1170 is communicatively coupled to the PCIe switches 1130, 1132 to enable communication between the GPUs 1160-1167 and other components of the server 1100. Other connection schemes could also be used. For instance, one or more of the GPUs 1160-1167 could connect to the PCIe switches 1130, 1132 and/or the CPUs 1110, 1112 directly, e.g., in an implementation in which a GPU switch 1170 is not present.

Referring now to details of one or more elements illustrated at FIG. 12, an illustrative cloud computing environment 1200 is depicted. FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream.

The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one processor, and
   at least one memory coupled to the at least one processor and having instructions stored thereon, wherein, in response to the at least one processor, the instructions facilitate performance of operations, comprising:
      monitoring demand data representative of an operational demand of a collection of central processing units (CPUs) located in a system, wherein the operational demand relates to at least one workload to be processed by the system, wherein the collection of CPUs comprises a first CPU and a second CPU, and wherein the system is prohibited from adjusting operation of the second CPU from a specified normal operating condition;
      determining whether a first operational demand represented by first operational demand data is below a performance threshold; and
      in response to a determination that the first operational demand is below the performance threshold, throttling operation of the first CPU, wherein the throttling of the operation of the first CPU comprises reducing a clock speed of the first CPU from a normal clock speed to a minimal clock speed, wherein the minimal clock speed has a first frequency less than a second frequency corresponding to the normal clock speed.

2. The system of claim 1, wherein the system is one of a data server, a data center, a storage system, a database system, or a client computing system.

3. The system of claim 1, wherein the operations further comprise:
   determining whether a second operational demand represented by second operational demand data is below the performance threshold; and
   in response to a determination that the second operational demand is not below the performance threshold, increasing the clock speed of the first CPU from the minimal clock speed to a higher clock speed, wherein the higher clock speed has a third frequency higher than the first frequency corresponding to the minimal clock speed.

4. The system of claim 3, wherein the operations further comprise:
   determining whether a third operational demand represented by second operational demand data is below the performance threshold, and
   in response to a determination that the third operational demand is below the performance threshold, further throttling the operation of the first CPU,
      wherein the further throttling of the operation of the first CPU adjusts the clock speed of the first CPU to the minimal clock speed; and
      maintaining operation of the second CPU at a second clock speed.

5. The system of claim 4, wherein the minimal clock speed is between 0.9 gigahertz (GHz) and 1.1 GHz, and the specified normal clock speed is between 2.0 GHz and 2.8 GHz.

6. The system of claim 1, wherein the operations further comprise:
   determining the performance threshold based on at least one of a time of operation applicable to the system, first electrical power available during off-peak energy demand via energy provider devices associated with an energy provider provisioning energy to the system, second electrical power available during peak energy demand via the energy provider devices associated with the energy provider, or a volume of computing operations to be performed by the system at a specified time or predicted to be performed by the system during a specified time range.

7. The system of claim 1, wherein the operations further comprise:
   applying a first policy configured to control the operation of the first CPU; and
   applying a second policy configured to control the operation of the second CPU.

8. The system of claim 1, wherein the operations further comprise:
   analyzing historical data, wherein the historical data relates to a prior operation of the system;
   determining, based on the analysis of the historical data, a future condition of the system, wherein the future condition is at a time subsequent to the first operational condition;
   determining the time of the future condition has been met; and
   in response to determining the time of the future condition has been met, increasing the clock speed of the first CPU from the minimal clock speed to a higher clock speed, wherein the higher clock speed has a frequency higher than the minimal clock speed.

9. The system of claim 3, wherein the higher clock speed has a first frequency higher than a second frequency corresponding to the normal clock speed.

10. A method, comprising:
    monitoring, by a device comprising at least one processor, operational demand of a collection of central processing units (CPUs) located in a system, wherein the collection of CPUs comprises a first CPU and a second CPU, wherein adjusting operation of the second CPU from a default operating condition is prohibited, and wherein the operational demand relates to one or more workloads to be processed by the system;
    determining, by the device, a first operational demand relative to a performance threshold; and
    in response to a determination that the first operational demand is below the performance threshold:
    throttling, by the device, first operation of the first CPU to adhere to a first operating condition, wherein the first operating condition involves fewer operations than the default operating condition; and
    maintaining, by the device, second operation of the second CPU to adhere to the default operating condition.

11. The method of claim 10, wherein the first operating condition is a clock speed frequency of between about 0.9 gigahertz (GHz) and about 1.1 GHZ, and the second operating condition is a clock speed frequency of between about 2.0 GHz and about 2.8 GHz.

12. The method of claim 10, wherein the performance threshold is based on at least one of a time of operation of the system, first electrical power available during off-peak energy demand via an energy provider system provisioning energy to the system, second electrical power available during peak energy demand via the energy provider system, or a volume of computer operations to be performed by the system at a given time.

13. The method of claim 10, further comprising:
    determining, by the device, a second operational demand relative to a performance threshold, wherein the second operational demand is subsequent to the first operational demand; and
    in response to a determination that the second operational demand is above the performance threshold:
    adjusting, by the device, the first operation of the first subset of CPUs in the collection of CPUs to adhere to a third operating condition, wherein the third operating condition is the default operating condition; and
    maintaining, by the device, the second operation of the second subset of CPUs in the collection of CPUs to adhere to the second operating condition.

14. The method of claim 10, wherein the device is located in one of a data server, a data center, a storage system, a database system, or a client computing system.

15. The method of claim 10, further comprising:
    applying a first policy configured to control the operation of the first CPU; and
    applying a second policy configured to control the operation of the second CPU.

16. A computer program product stored on a non-transitory computer-readable medium and comprising machine-executable instructions, wherein, in response to being executed, the machine-executable instructions cause computing equipment to perform operations, comprising:
    monitoring a first operating condition of a data server comprising a set of CPUs, wherein the set of CPUs comprising a first subset of CPUs and a second subset of CPUs;
    comparing the first operating condition to a threshold value; and
    in response to a result of the comparing being determined to be that the first operating condition is below the threshold value:
    maintaining first operation of the first subset of CPUs at a normal operating condition, wherein the first subset of CPUs has been identified to remain at a constant operation at the normal operating condition and the computing equipment is prohibited from adjusting operation of the first subset of CPUs; and
    adjusting second operation of the second subset of CPUs at a lower limit applicable to operating condition, wherein the lower limit applicable to operating condition is a first clock speed and the normal operating condition is a second clock speed, wherein the first clock speed is less than the second clock speed, wherein the lower limit applicable to operating condition is specified to be a clock speed frequency between 0.9 gigahertz (GHz) and 1.1 GHZ, wherein the normal operating condition is specified to be a clock speed frequency of between 2.0 GHz and 2.8 GHZ, and wherein the lower limit clock-speed facilitates operation of the computing equipment at a reduced power.

17. The computer program product according to claim 16, wherein the operations further comprise:

monitoring a second operating condition of the data server, wherein the second operating condition has manifested subsequent to the first operating condition;

comparing the second operating condition to the threshold value; and in response to a result of the comparing of the second operating condition to the threshold value being determined to be that the second operating condition is above the threshold value:

maintaining the first operation of the first subset of CPUs at the normal operating condition;

adjusting an operation of a first CPU in the second subset of CPUs to the normal operating condition; and maintaining the second operation of a second CPU in the second subset of CPUs at the lower limit applicable to operating condition.

18. The computer program product according to claim 17, wherein the threshold value is determined based on at least one of a time of operation of the data server, first electrical power available to the data server during a defined off-peak energy demand time period, second electrical power available to the data server during a defined peak energy demand time period, or a volume of computer operations to be performed by the data server at a defined time.

19. The computer program product according to claim 16, wherein the operations further comprise:

applying a first policy configured to control the first operation of the first subset of CPUs; and applying a second policy configured to control the second operation of the second subset of CPUs.

20. The computer program product according to claim 16, wherein the computing equipment is located in one of a data server, a data center, a storage system, a database system, or a client computing system.

* * * * *